US011494022B2

(12) United States Patent
Astley et al.

(10) Patent No.: US 11,494,022 B2
(45) Date of Patent: Nov. 8, 2022

(54) FORCE SENSING TOUCH PANEL

(71) Applicant: Cambridge Touch Technologies Ltd., Cambridge (GB)

(72) Inventors: Michael Astley, Cambridge (GB); Arokia Nathan, Cambridge (GB); Constantinos Tsangarides, Cambridge (GB); Paridhi Sharma, Cambridge (GB); Antonio Afonso Bras Ferreira Marques, Haddenham (GB); Xiang Cheng, Cambridge (GB); Jiahao Li, Cambridge (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

(21) Appl. No.: 17/432,000

(22) PCT Filed: Feb. 17, 2020

(86) PCT No.: PCT/GB2020/050368
§ 371 (c)(1),
(2) Date: Aug. 18, 2021

(87) PCT Pub. No.: WO2020/169953
PCT Pub. Date: Aug. 27, 2020

(65) Prior Publication Data
US 2022/0137767 A1    May 5, 2022

(30) Foreign Application Priority Data

Feb. 19, 2019    (GB) ...................................... 1902254

(51) Int. Cl.
*G06F 3/041*    (2006.01)
*G06F 3/044*    (2006.01)

(52) U.S. Cl.
CPC ........ *G06F 3/04144* (2019.05); *G06F 3/0445* (2019.05); *G06F 3/0446* (2019.05);
(Continued)

(58) Field of Classification Search
CPC .. G06F 3/04144; G06F 3/0446; G06F 3/0445; G06F 3/04166; G06F 3/041661;
(Continued)

(56) References Cited

U.S. PATENT DOCUMENTS 5,374,787 A    12/1994 Miller et al.
6,492,979 B1    12/2002 Kent et al.
(Continued)

FOREIGN PATENT DOCUMENTS

JP    2010026938 A    2/2010
JP    2013131110 A    7/2013
(Continued)

OTHER PUBLICATIONS

International Search Report and Written Opinion, dated Apr. 2, 2020 directed to International application No. PCT/GB2020/050368, 15 pages.

(Continued)

*Primary Examiner* — Afroza Chowdhury

(57) ABSTRACT

A force-sensing touch panel (31) is described which includes a layer structure stacked in a thickness direction between first and second surfaces. The layer structure includes from first surface to second surface, a number of first electrodes (7) and a number of second electrodes (8), a layer of piezoelectric material (9), and a number of third electrodes (30). The first and second electrodes (7, 8) are configured to define a coordinate system for sensing a location of a force applied to the touch panel in a plane perpendicular to the thickness direction. The third electrodes (30) are configured such that signals received from the first, second and third (Continued)

electrodes (7, 8, 30) enable determining unique locations corresponding to two or more forces applied to the touch panel (31) concurrently.

19 Claims, 18 Drawing Sheets

(52) U.S. Cl.
CPC ...... *G06F 3/04166* (2019.05); *G06F 3/04186* (2019.05); *G06F 3/041661* (2019.05); *G06F 2203/04104* (2013.01); *G06F 2203/04106* (2013.01)

(58) Field of Classification Search
CPC ....... G06F 3/04186; G06F 2203/04104; G06F 2203/04106; G06F 3/0414
See application file for complete search history.

(56) References Cited

U.S. PATENT DOCUMENTS

| | | |
|---|---|---|
| 8,988,384 B2 | 3/2015 | Krah |
| 9,417,725 B1 | 8/2016 | Watazu et al. |
| 9,569,035 B1 | 2/2017 | Lee et al. |
| 9,575,599 B1 | 2/2017 | Wilson et al. |
| 9,575,608 B2 | 2/2017 | Ando et al. |
| 9,690,408 B1 | 6/2017 | Krah |
| 9,698,776 B2 | 7/2017 | Toda et al. |
| 9,891,772 B2 | 2/2018 | Kitada et al. |
| 9,904,393 B2 | 2/2018 | Frey et al. |
| 9,983,715 B2 | 5/2018 | Filiz et al. |
| 10,061,434 B2 | 8/2018 | Nathan et al. |
| 10,120,477 B2 | 11/2018 | Kitada et al. |
| 10,120,478 B2 | 11/2018 | Filiz et al. |
| 10,126,807 B2 | 11/2018 | Nathan et al. |
| 10,254,894 B2 | 4/2019 | Nathan et al. |
| 10,282,046 B2 | 5/2019 | Nathan et al. |
| 10,289,247 B2 | 5/2019 | Nathan et al. |
| 10,310,659 B2 | 6/2019 | Nathan et al. |
| 10,318,038 B2 | 6/2019 | Nathan et al. |
| 10,430,009 B2 | 10/2019 | Nathan et al. |
| 10,496,210 B2 | 12/2019 | Nathan et al. |
| 10,599,268 B2 | 3/2020 | Nathan et al. |
| 10,691,208 B2 | 6/2020 | Toma et al. |
| 10,739,926 B2 | 8/2020 | Nathan et al. |
| 10,817,116 B2 | 10/2020 | Bagheri et al. |
| 10,852,875 B2 | 12/2020 | Routley et al. |
| 10,928,947 B2 | 2/2021 | Micci et al. |
| 10,928,950 B2 | 2/2021 | Nathan et al. |
| 11,093,088 B2 | 8/2021 | Bagheri et al. |
| 11,221,703 B2 | 1/2022 | Routley et al. |
| 11,231,801 B2 | 1/2022 | Routley et al. |
| 11,237,667 B2 | 2/2022 | Nathan et al. |
| 2005/0174247 A1 | 8/2005 | Kurtz et al. |
| 2008/0018608 A1 | 1/2008 | Serban et al. |
| 2009/0254869 A1 | 11/2009 | Ludwig et al. |
| 2009/0309616 A1 | 12/2009 | Klinghult et al. |
| 2010/0085322 A1 | 4/2010 | Mamba et al. |
| 2010/0123686 A1 | 5/2010 | Klinghult et al. |
| 2010/0309164 A1 | 12/2010 | Yeh et al. |
| 2011/0096025 A1 | 4/2011 | Elliott et al. |
| 2011/0102061 A1 | 5/2011 | Wang et al. |
| 2012/0038584 A1 | 2/2012 | LIu |
| 2012/0268416 A1 | 10/2012 | Pirogov et al. |
| 2013/0127776 A1 | 5/2013 | Guard et al. |
| 2013/0176274 A1 | 7/2013 | Sobel |
| 2013/0265256 A1 | 10/2013 | Nathan et al. |
| 2013/0278544 A1 | 10/2013 | Cok |
| 2014/0008203 A1 | 1/2014 | Nathan et al. |
| 2014/0022211 A1 | 1/2014 | Karpin et al. |
| 2014/0049892 A1 | 2/2014 | Huang et al. |
| 2014/0062934 A1 | 3/2014 | Coulsen et al. |
| 2014/0292699 A1 | 10/2014 | Ando |
| 2014/0341446 A1 | 11/2014 | Hare et al. |
| 2014/0354585 A1 | 12/2014 | Cok et al. |
| 2014/0375580 A1 | 12/2014 | Peshkin et al. |
| 2015/0009175 A1 | 1/2015 | Berget et al. |
| 2015/0130770 A1 | 5/2015 | Takatori |
| 2015/0168466 A1 | 6/2015 | Park et al. |
| 2015/0185955 A1 | 7/2015 | Ando et al. |
| 2015/0199061 A1 | 7/2015 | Kitada et al. |
| 2015/0253935 A1 | 9/2015 | Toda et al. |
| 2015/0261344 A1 | 9/2015 | Wigdor |
| 2015/0234446 A1 | 11/2015 | Nathan et al. |
| 2015/0331517 A1 | 11/2015 | Filiz et al. |
| 2015/0355771 A1 | 12/2015 | Watazu et al. |
| 2016/0011666 A1 | 1/2016 | Evreinov et al. |
| 2016/0034088 A1 | 2/2016 | Richards et al. |
| 2016/0034089 A1 | 2/2016 | Kano et al. |
| 2016/0062505 A1 | 3/2016 | Hwang et al. |
| 2016/0098131 A1 | 4/2016 | Ogata et al. |
| 2016/0117034 A1 | 4/2016 | Day |
| 2016/0124544 A1 | 5/2016 | Kang et al. |
| 2016/0179276 A1 | 6/2016 | Nathan et al. |
| 2016/0291729 A1 | 10/2016 | Schardt et al. |
| 2016/0299625 A1 | 10/2016 | Kano |
| 2017/0153749 A1 | 2/2017 | Noguchi et al. |
| 2017/0108973 A1 | 4/2017 | Kim et al. |
| 2017/0139527 A1 | 5/2017 | Nathan et al. |
| 2017/0199624 A1 | 7/2017 | Nathan et al. |
| 2017/0228072 A1 | 8/2017 | Amin et al. |
| 2017/0228096 A1 | 8/2017 | Nathan et al. |
| 2017/0262099 A1 | 9/2017 | Nathan et al. |
| 2017/0371470 A1 | 12/2017 | Nathan et al. |
| 2018/0088718 A1 | 3/2018 | Liu et al. |
| 2018/0143728 A1 | 5/2018 | Withers et al. |
| 2018/0157364 A1 | 6/2018 | Frey et al. |
| 2018/0183438 A1 | 6/2018 | Shigetaka et al. |
| 2018/0307365 A1 | 10/2018 | Chen et al. |
| 2018/0335846 A1 | 11/2018 | Toma et al. |
| 2019/0050080 A1 | 2/2019 | Bagheri et al. |
| 2019/0114001 A1 | 4/2019 | Muriganeza et al. |
| 2019/0227649 A1 | 7/2019 | Micci et al. |
| 2019/0243502 A1 | 8/2019 | Nathan et al. |
| 2019/0286263 A1 | 9/2019 | Bagheri et al. |
| 2019/0361559 A1 | 11/2019 | Guo et al. |
| 2020/0026409 A1 | 1/2020 | Sagawai |
| 2020/0218384 A1 | 7/2020 | Guo et al. |
| 2021/0055832 A1 | 2/2021 | Bagheri |
| 2021/0124458 A1 | 4/2021 | Marques et al. |
| 2021/0141507 A1 | 5/2021 | Micci et al. |
| 2021/0263633 A1 | 8/2021 | Astley et al. |
| 2021/0373698 A1 | 12/2021 | Astley et al. |

FOREIGN PATENT DOCUMENTS

| | | |
|---|---|---|
| JP | 2014-209297 A | 11/2014 |
| WO | 2016102975 A2 | 6/2016 |
| WO | 2017109455 A1 | 6/2017 |

OTHER PUBLICATIONS

Combined Search and Examination Report under Sections 17 and 18(3) for UK application No. GB1902254.0 dated Jul. 24, 2019, 6 pages.

FORCE SENSING TOUCH PANEL

RELATED APPLICATIONS

This application is a 35 U. S. C. § 371 application of PCT Application No. PCT/GB2020/050368, filed Feb. 17, 2020, which claims priority to United Kingdom application GB1902254.0, filed Feb. 19, 2019, each of which is hereby incorporated by reference as if fully disclosed herein.

FIELD

The present invention relates to a touch panel for force sensing, in particular multi-touch force sensing.

BACKGROUND

Touch screen panels having force-sensing capabilities can enhance user experience through three-dimensional multi-touch interaction.

In a touch panel, drive and sensing electrodes are used for projective capacitive touch detection. To add force-detection capabilities, a piezoelectric layer, an electrode (which may be the drive or sensing electrode) and a counter electrode, which is held at a fixed voltage or ground, are employed. Additional dielectric layers such as PET thin film, adhesives and cover glass may be included to integrate the layers and provide mechanical robustness. Together, the configuration of the layers in the sensor stack defines a sensor architecture.

Examples of touch sensors combining capacitive sensing with piezoelectric based force-detection capabilities are described in WO 2016/102975 A1. This document also describes examples of embedded touch panels (in which electrodes are interspersed with display elements such as polarisers etc), in which a patterned electrode is positioned between a user input surface and the drive and sensing electrodes. Further examples of touch sensors combining capacitive sensing with piezoelectric based force-detection capabilities are described in WO 2017/109455 A1.

Touch panels which use piezoelectric based force-detection without a secondary location sensing method (for example resistive or capacitive touch sensing) have been proposed. For example JP 2010-026938 A describes a touch panel which includes a piezoelectric body layer containing a polyvinylidene fluoride-ethylene tetrafluoride copolymer, a first electrode provided on one surface of the piezoelectric body layer, and a second electrode provided on the other surface of the piezoelectric body layer.

SUMMARY

According to a first aspect of the invention there is provided a force-sensing touch panel which includes a layer structure stacked in a thickness direction between first and second surfaces. The layer structure includes from first surface to second surface, a number of first electrodes and a number of second electrodes, a layer of piezoelectric material, and a number of third electrodes. The first and second electrodes are configured to define a coordinate system for sensing a location of a force applied to the touch panel in a plane perpendicular to the thickness direction. The third electrodes are configured such that signals received from the first, second and third electrodes enable determining unique locations corresponding to two or more forces applied to the touch panel concurrently.

The layer of piezoelectric material may be stacked (equivalently disposed or arranged) between the third electrodes and the second electrodes and between the third electrodes and the first electrodes. The first and second electrodes may be disposed substantially on a single plane normal to the thickness direction, and the layer structure may include, in order, the first and second electrodes, the layer of piezoelectric material, and the third electrodes. The first and second electrodes may be arranged on different planes normal to the thickness direction, and the layer structure may include, in order, the first electrodes, the second electrodes, the layer of piezoelectric material, and the third electrodes. The first and second electrodes may be separated by one or more dielectric layers. The force-sensing touch panel may be stacked with a display so that the first surface faces the display. The force-sensing touch panel may be stacked with a display so that the second surface faces the display. The force-sensing touch panel may be installed so that, in use, the third electrodes are closer to a user of the touch panel than the first and second electrodes. Alternatively, the force-sensing touch panel may be installed so that, in use, the first and second electrodes are closer to a user of the touch panel than the third electrodes.

Each third electrode may overlap with at least two first electrodes and at least two second electrodes. The third electrodes may be configured to enable determining locations which comprise a first location corresponding to a first applied force and a second location corresponding to a second applied force. The first and second locations may be separated by a distance of greater than or equal to 0.5 cm. The first and second locations may be separated by a distance of greater than or equal to 1 cm. The first and second locations may be separated by a distance of greater than or equal to 1.5 cm.

The first electrodes may enable measurement of the applied force as a function of a first coordinate of the coordinate system. The second electrodes may enable measurement of the applied force as a function of a second coordinate of the coordinate system. Each third electrode may correspond to a path requiring parameterisation using both the first and second coordinates. The third electrodes may correspond to a family of paths (or curves), each of which requires parameterisation using both the first and second coordinates. In general, the coordinate system may be any curvilinear coordinate system capable of describing positions in a plane perpendicular to the thickness direction.

Where a given third electrode intersects a given first electrode, a tangent along the given third electrode may make an angle of greater than zero to a tangent along the given first electrode. Where a given third electrode intersects a given first electrode, a tangent along the given third electrode may make an angle of about 45 degrees to a tangent along the given first electrode. The term about 45 degrees may mean 45±1 degrees, 45±5 degrees, or 45±10 degrees.

Where a given third electrode intersects a given second electrode, a tangent along the given third electrode may make an angle of greater than zero to a tangent along the given second electrode. Where a given third electrode intersects a given second electrode, a tangent along the given third electrode may make an angle of about 45 degrees to a tangent along the given second electrode. The term about 45 degrees may mean 45±1 degrees, 45±5 degrees, or 45±10 degrees.

A perimeter of the force-sensing panel may be circular, square, rectangular, or any other shape desired for a particular application.

Each of the first electrodes may extend in a first direction which is perpendicular to the thickness direction. Each of the second electrodes may extend in a second direction which is perpendicular to the thickness direction and different to the first direction. The first and second directions may be perpendicular.

Each of the third electrodes may extend in a third direction which is perpendicular to the thickness direction and different to the first and second directions. The third direction may make an angle of about 45 degrees with the first direction. The third direction may make an angle of about 45 degrees with the second direction.

The third electrodes may have a width, which is at least 0.5 times a pitch of the third electrodes, and less than the pitch. The third electrodes may have a width which is at least 0.75 times a pitch of the third electrodes, and less than the pitch. The third electrodes may have a width which is at least 0.9 times a pitch of the third electrodes, and less than the pitch. The third electrodes may have a width which is at least 0.95 times a pitch of the third electrodes, and less than the pitch. The third electrodes may have a width which is less than or equal to 0.5 times a pitch of the third electrodes. The third electrodes may have a width which is less than or equal to 0.25 times a pitch of the third electrodes. The third electrodes may have a width which is less than or equal to 0.1 times a pitch of the third electrodes. The third electrodes may have a width which is less than or equal to 0.05 times a pitch of the third electrodes.

The first and second electrodes may define a circular polar coordinate system.

The plurality of third electrodes may include an array of pads spaced across an area of the touch panel substantially corresponding to the coordinate system defined by the first and second electrodes. Each pad may overlie two or more first electrodes. Each pad may overlie two or more second electrodes. The dimensions and/or spacing of each pad may be selected based on a desired spatial resolution for uniquely determining locations of two or more applied forces.

Each third electrode may extend along a substantially spiral shaped path. An initial angular separation of each third electrode may be equal to an angular separation of first or second electrodes which enable measurement of the applied force as a function of an angle. An initial angular separation of each third electrode may be greater than the angular separation of first or second electrodes which enable measurement of the applied force as a function of an angle.

A spatial resolution of the third electrodes may be coarser than a spatial resolution of the first electrodes. The spatial resolution of the third electrodes may be coarser than a spatial resolution of the second electrodes.

A touch panel system may include the force-sensing touch panel, and a controller having a number of inputs. Each of the first, second and third electrodes may be connected to one of the inputs. The controller may be configured to measure, for each of the first, second and third electrodes, a charge induced in response to application of one or more forces to the touch panel.

The controller may be further configured to determine, based on the measured induced charges, the unique locations corresponding to two or more forces applied to the touch panel concurrently.

The controller may be configured to determine, based on measured induced charges corresponding to the first and second electrodes, one or more possible sets of locations for one of more forces applied to the touch panel. The controller may be configured to, in response to two or more sets of locations are consistent with the measured induced charges corresponding to the first and second electrodes, use the measured induced charges corresponding to the third values to determine a unique set of locations for the one or more forces.

The force-sensing touch panel may be disposed between a display and a cover. The third electrodes may be between the layer of piezoelectric material and the cover. The touch panel system may be configured such that, in use, the third electrodes are closer to a user of the touch panel system.

The force-sensing touch panel may be disposed between a display and a cover. The first and second electrodes may be between the layer of piezoelectric material and the cover. The touch panel system may be configured such that, in use, the first and second electrodes are closer to a user of the touch panel system.

The controller may be further configured to determine a self-capacitance of each first electrode and a self-capacitance of each second electrode. The controller may be configured to determine a self-capacitance of each first electrode and a self-capacitance of each second electrode simultaneously with determining the magnitude of one or more applied forces. The controller may be configured to determine a self-capacitance of each first electrode and a self-capacitance of each second electrode sequentially with determining the magnitude of one or more applied forces.

The controller may be further configured to determine a mutual-capacitance between each distinct pairing of first and second electrodes. The controller may be configured to determine a mutual-capacitance between each distinct pairing of first and second electrodes simultaneously with determining the magnitude of one or more applied forces. The controller may be configured to determine a mutual-capacitance between each distinct pairing of first and second electrodes sequentially with determining the magnitude of one or more applied forces.

A device may include the touch panel or the touch panel system.

A wearable device may include the touch panel or the touch panel system. A wearable device may take the form of a watch, a smart watch, a bracelet, a belt, a buckle, glasses, lenses of glasses, frames of glasses, jewellery, and so forth.

According to a second aspect of the invention, there is provided a method of determining unique locations corresponding to two or more forces applied to a touch panel which includes a layer structure stacked in a thickness direction between first and second surfaces. The layer structure includes from first surface to second surface, a number of first electrodes and a number of second electrodes, a layer of piezoelectric material, and a number of third electrodes. The first and second electrodes are configured to define a coordinate system for sensing a location of a force applied to the touch panel in a plane perpendicular to the thickness direction. The third electrodes are configured such that signals received from the first, second and third electrodes enable determining unique locations corresponding to two or more forces applied to the touch panel concurrently. The method includes measuring a number of first values. Each first value corresponds to a charge induced on a respective first electrode in response to application of one or more forces to the touch panel. The method also includes measuring a plurality of second values. Each second value corresponds to a charge induced on a respective second electrode in response to application of one or more forces to the touch panel. The method also includes measuring a plurality of third values. Each third value corresponds to a charge induced on a respective third electrode in response to application of one or more forces to the touch panel. The method also includes determining, based on the first and second values, one or more possible sets of locations for the one of more forces. The method also includes, in response to two or more sets of locations are consistent with the first and second values, applying the third values to determine a unique set of locations.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Figure 1:
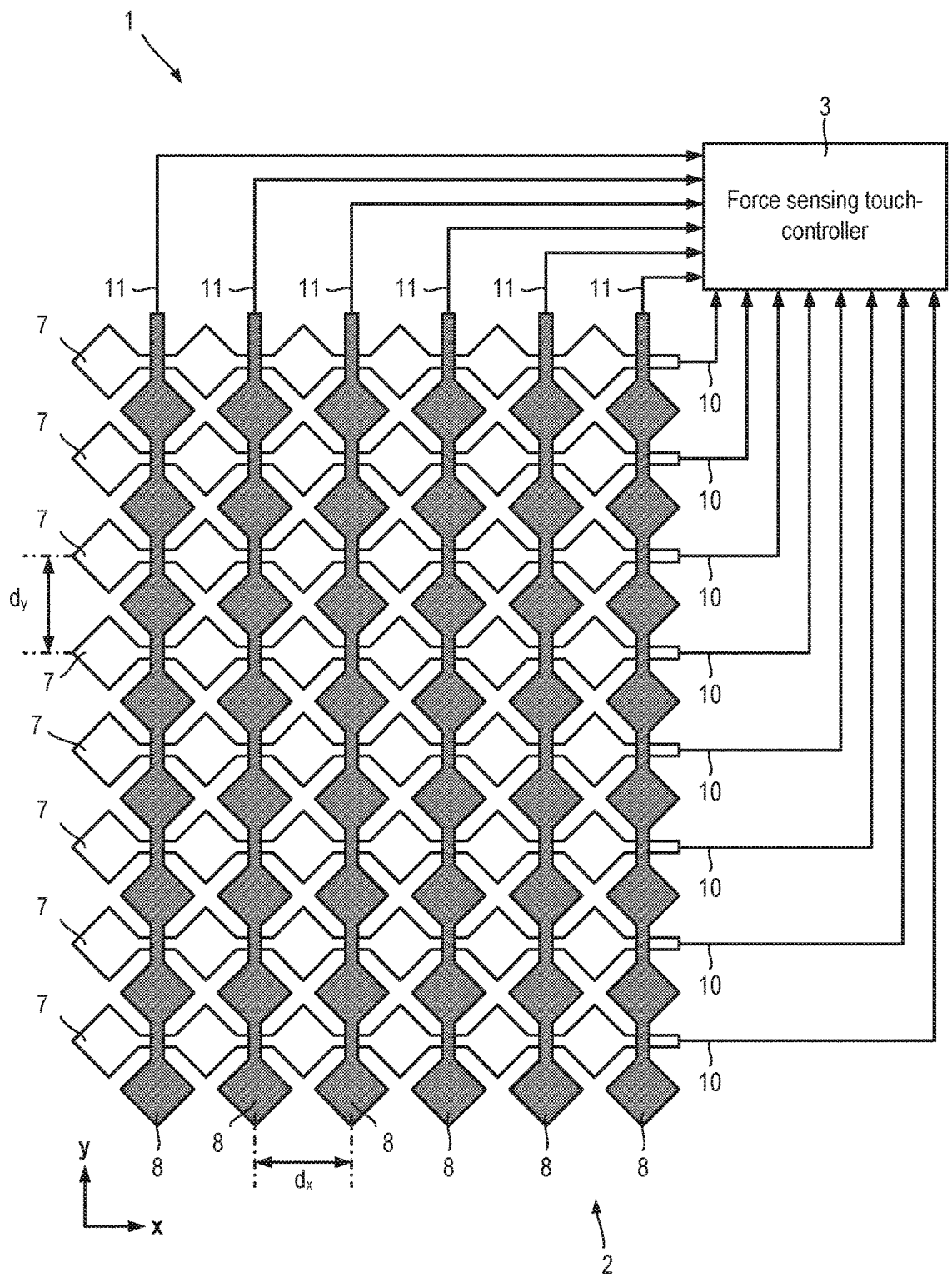
FIG. 1 illustrates a first force sensing touch panel useful for understanding the present specification.
Figure 2:
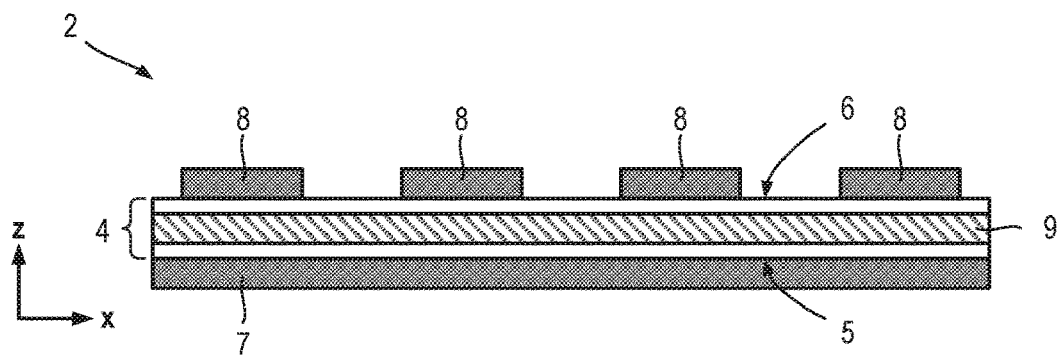
FIG. 2 is a schematic cross-section of a first force sensing touch panel useful for understanding the present specification.

Referring to FIGS. 1 and 2, an example of a force-sensing touch panel system 1 (also referred to as touch panel system 1) is shown which is useful for understanding the present specification.

The force-sensing touch panel system 1 includes a first force-sensing touch panel 2 (also referred to as first touch panel 2) and a force-sensing touch-controller 3 (also referred to as touch-controller 3).

The first touch panel 2 includes a layer structure 4 having a first face 5 and a second, opposite, face 6, a number of first electrodes 7 and a number of second electrodes 8.

The layer structure 4 includes one or more layers, including at least a layer of piezoelectric material 9. Each layer included in the layer structure 4 is generally planar and extends in first x and second $y$ directions which are perpendicular to a thickness direction z. The one or more layers of the layer structure 4 are arranged between the first and second faces 5, 6 such that the thickness direction z of each layer of the layer structure 4 is perpendicular to the first and second faces 5, 6. The first electrodes 7 are disposed on the first face 5 of the layer structure 4, and the second electrodes 8 are disposed on the second face 6 of the layer structure 4. In this way, when an applied force causes the touch panel 2 to deform, a resulting piezoelectric polarisation generated in the layer of piezoelectric material 9 will induce potential differences between the first and second electrodes 7, 8. Charges will flow to/from the first and second electrodes 7, 8 to cancel out the polarisation electric field, and the touch controller 3 measures charge values corresponding to each first and second electrode 7, 8. Based on the measured induced charges, the touch controller 3 may estimate an applied force, and as explained hereinafter, may estimate the location of a single applied force, i.e. when a force is applied to the touch panel 2 at only one location.

The first electrodes 7 each extend in the first direction x and the first electrodes 7 are disposed in an array evenly spaced in the second direction y with a pitch $d_y$. The second electrodes 8 each extend in the second direction y and the second electrodes 8 are disposed in an array evenly spaced in the first direction x with a pitch $d_x$. In this example, the pitches $d_x$ and $d_y$ are equal, although in other examples $d_x$ and $d_y$ need not be equal. The first and second electrodes 7, 8 take the form of diamond-patterned electrodes known from mutual-capacitance based touchscreens. Each first electrode 7 is electrically coupled to the touch controller 3 via respective traces 10, and each second electrode 8 is coupled to the touch controller 3 via respective traces 11. In this way, the first and second electrodes 7, 8 define a Cartesian coordinate system, which may be employed for sensing a location of a force applied to the touch panel 2. The location is an x, $y$ coordinate, i.e. the coordinate system defined by the first and second electrodes 7, 8 lies in an x-$y$ plane, perpendicular to the thickness direction z.

Preferably, the piezoelectric material 9 is a piezoelectric polymer such as polyvinylidene fluoride (PVDF). However, the piezoelectric material 9 may alternatively be a layer of a piezoelectric ceramic such as lead zirconate titanate (PZT). Preferably, the first and second electrodes 7, 8 are indium tin oxide (ITO) or indium zinc oxide (IZO). However, the first and second electrodes 7, 8 may be metal films such as aluminium, copper, silver or other metals suitable for deposition and patterning as a thin film. The first and second electrodes 7, 8 may be conductive polymers such as polyaniline, polythiphene, polypyrrole or poly(3,4-ethylenedioxythiophene) polystyrene sulfonate (PEDOT/PSS). The first and second electrodes 7, 8 may be formed from a metal mesh; nanowires, optionally silver nanowires; graphene; and carbon nanotubes.

The conductive traces 10, 11 may be made of the same materials as the first and second electrodes 7, 8. Alternatively, the conductive traces 10, 11 may be made of a material having a higher conductivity than the material used for the first and second electrodes 7, 8. The conductive traces 10, 11 are generally much thinner in the plane defined by the first and second directions x, $y$ than the corresponding first and/or second electrodes 7, 8.

The layer structure 4 may include only the layer of piezoelectric material 9, such that the first and second opposite faces 5, 6 are faces of the layer of piezoelectric material 9. Alternatively, the layer structure 4 may include one or more dielectric layers 12 (FIG. 3) which are stacked between the layer of piezoelectric material 9 and the first face 5 of the layer structure 4. The layer structure 4 may include one or more dielectric layers 12 (FIG. 3) stacked between the second face 6 of the layer structure 4 and the layer of piezoelectric material 9. Preferably, one or more dielectric layer(s) 12 (FIG. 3) include layers of a polymer dielectric material such as polyethylene terephthalate (PET), or layers of pressure sensitive adhesive (PSA) material. However, one or more dielectric layer(s) (FIG. 3) may include layers of a ceramic insulating material such as aluminium oxide.

When the first touch panel 2 is intended to overlie a display, all of the components of the first touch panel 2 overlying said display should preferably be formed of transparent materials, or have dimensions thin enough to avoid obscuring the display, or be aligned with gaps between pixels of the display.

Although in practice, the first and second electrodes 7, 8 are typically formed into an orthogonal Cartesian grid, this is not essential. The first and second electrodes 7, 8 may meet at any angle and still provide a coordinate system. In general, the first and second electrodes 7, 8 may be shaped to define any coordinate system, including generalised curvilinear coordinate systems.

When the first touch panel 2 is curved or applied to a curved surface, the coordinate system defined by the first and second electrodes 7, 8 may remain locally perpendicular to the thickness direction.

First and second electrodes 7, 8 forming a diamond-pattern are not required, and other shapes may be used, including simple rectangular electrodes 7, 8.

Figure 3:
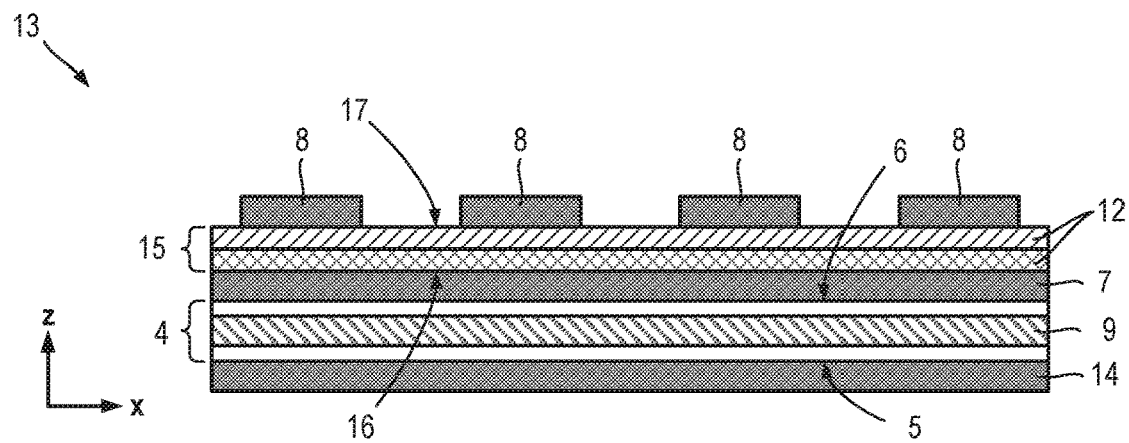
FIG. 3 is a schematic cross-section of a second force sensing touch panel useful for understanding the present specification.

Referring also to FIG. 3, a second force-sensing touch panel 13 (also referred to as the second touch panel 13) is shown.

The second touch panel 13 includes the layer structure 4, the first electrodes 7 and the second electrodes 8, and additionally includes a counter electrode 14 (sometimes also referred to as a "common electrode") and a second layer structure 15 having third and fourth opposite faces 16, 17.

In contrast to the first touch panel 2, the first and second electrodes 7, 8 are spaced apart by the second layer structure in the second touch panel 13. In the second touch panel 13, the first and second electrodes 7, 8 are both on the same side of the layer of piezoelectric material 9. In this way, when an applied force causes the touch panel 2 to deform, resulting piezoelectric polarisation generated in the layer of piezoelectric material 9 will induce potential differences between the counter electrode 14 and the first electrodes 7, and between the counter electrode 14 and the second electrodes 8. The counter electrode 14 may be patterned or unpatterned, and takes the form of a single conductive region in either case. The counter electrode 14 is substantially co-extensive with the coordinate system defined by the first and second electrodes 7, 8. Preferably, the counter electrode 14 is made of indium tin oxide (ITO) or indium zinc oxide (IZO). However, the counter electrode 14 may be a metal mesh film such as aluminium, copper, silver or other metals suitable for deposition and patterning as a thin film. The counter electrode 14 may be made of a conductive polymer such as polyaniline, polythiphene, polypyrrole or poly(3,4-ethylenedioxythiophene) polystyrene sulfonate (PEDOT/PSS).

The second layer structure 15 includes one or more dielectric layers 12. Each dielectric layer 12 is generally planar and extends in first x and second y directions perpendicular to the thickness direction z. The one or more dielectric layers 12 of the second layer structure 15 are arranged between the third and fourth faces 16, 17 such that the thickness direction z of each dielectric layer 12 of the second layer structure 15 is perpendicular to the third and fourth faces 16, 17. The second electrodes 8 are disposed on the fourth face 17 of the second layer structure 15. The first electrodes 7 may be supported on the second face 6 of the first layer structure 4 or on the first face 16 of the second layer structure 15.

Preferably, the dielectric layer(s) 12 include layers of a polymer dielectric material such as PET or layers of PSA materials. However, the dielectric layer(s) 12 may include layers of a ceramic insulating material such as aluminium oxide.

Figure 4:
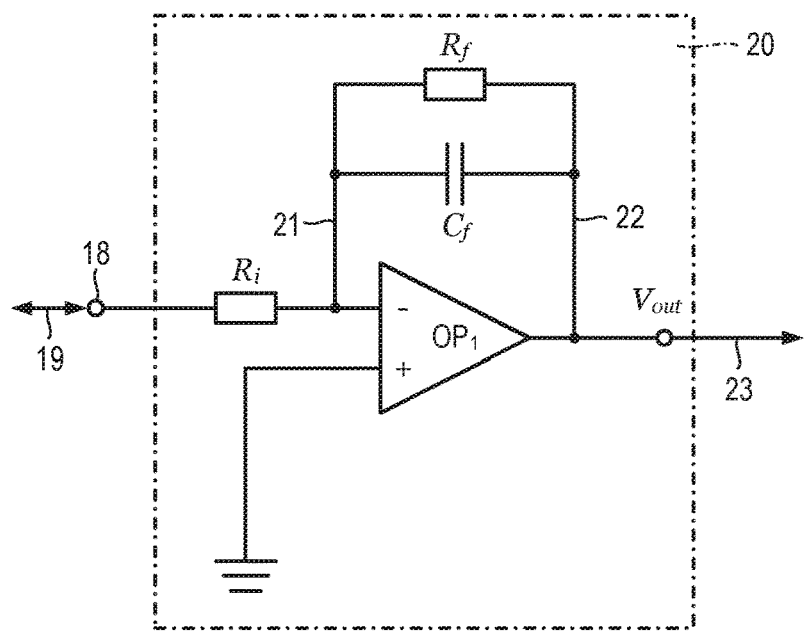
FIG. 4 illustrates a charge amplifier.

Referring also to FIG. 4, an amplifier for an input terminal 18 to the touch controller 3 is shown.

Each conductive trace 10, 11 connects a first or second electrode 7, 8 to a corresponding input terminal 18 of the touch controller 3. Induced piezoelectric charges 19 are supplied to, or received from, a corresponding charge amplifier 20. Charges supplied to opposite sides of the layer of piezoelectric material 9 have opposite signs. When the first touch panel 2 is used, if one or more first electrodes 7 become positively charged in response to piezoelectric polarisation, then one of more second electrodes 8 will become negatively charged, and vice versa. When the second touch panel 13 is used, the counter electrode 14 is connected to ground or a common mode voltage WM, so that induced piezoelectric charges 19 for the first and second electrodes 7, 8 have the same sign.

In general, any charge amplifier 20 suitable for measurement of induced piezoelectric charges 19 may be used. One example of a suitable charge amplifier 20 is shown in FIG. 4. The example charge amplifier 20 includes an operational amplifier $OP_1$ having at least an inverting input coupled to a first node 21, a non-inverting input coupled to system ground (or a common mode voltage), and an output coupled to a second node 22. The example charge amplifier 20 includes an input resistor $R_i$ coupling the first node 21 to the terminal 18. In this way, example charge amplifier 20 is electrically coupled to a first or second electrode 7, 8. The example charge amplifier 20 also includes a feedback resistor $R_f$ coupling the first and second nodes 21, 22, and a feedback capacitor $C_f$ coupling the first and second nodes 21, 22. The gain and frequency dependence of the example charge amplifier 20 are controlled by the feedback resistor $R_f$ and the feedback capacitor $C_f$ which provide a negative feedback network for the operational amplifier $OP_1$. In the example charge amplifier 20, the second node 22 provides an amplified output signal 23 via an output terminal Lout. The amplified output signal 23 takes the form of a voltage which is proportional to the induced piezoelectric charges 19.

Other terminals of the operational amplifier $OP_1$, such as power supply terminals, may be present but are not shown in this or other schematic circuit diagrams described herein. Additional passive components, including resistors, capacitors and inductors, may be present but are not shown in this or other schematic circuit diagrams described herein. The feedback network of the operational amplifier $OP_1$ may include a switch (not shown) to permit discharging the feedback capacitor $C_f$ periodically or in response to an extended duration of low or zero activity.

Multi-Touch Location Ambiguity

As mentioned hereinbefore, the force-sensing touch panel system 1 may be used to determine a location for a single applied force. However, as shall be explained, the force-sensing touch panel system 1 cannot reliably and accurately determine locations corresponding to two (or more) concurrently applied forces.

Figure 5:
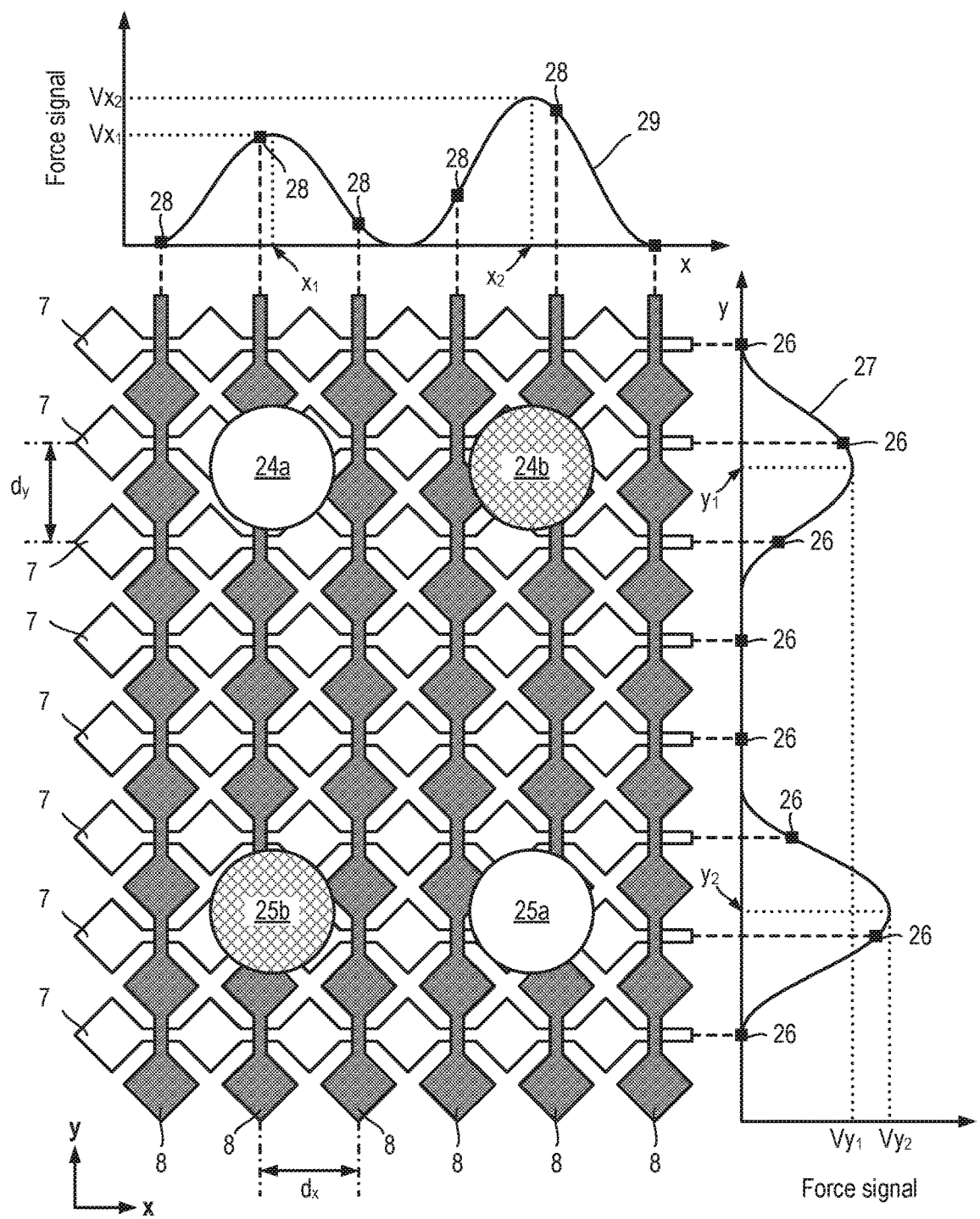
FIG. 5 illustrates ambiguities which may arise when using a force sensing touch panel.

Referring also to FIG. 5, two sets of locations 24a, 25a, 24b, 25b corresponding to first and second applied forces $F_1$, $F_2$ are shown.

A first force $F_1$ is applied to the touch panel 2 at an actual first location 24a having coordinates ($x_1$, $y_1$) and a second force $F_2$ is applied to the touch panel 2 at an actual second location 25a having coordinates ($x_2$, $y_2$). The applied forces $F_1$, $F_2$ are detected by the touch controller 3 as a set of first measured values 26 corresponding to the first electrodes 7. As a visual guide, an underlying force signal profile 27 as a function of the $y$ coordinate is also shown. The underlying force signal profile 27 represents a force signal which might be recorded if the touch panel 2 was capable of continuous resolution. Similarly, the applied forces $F_1$, $F_2$ are also detected by the touch controller 3 as a set of second measured values 28 corresponding to the second electrodes 8, and an underlying force signal profile 29 as a function of the x coordinate is also shown as a visual guide. As illustrated, the relative positions of the applied forces $F_1$, $F_2$ and the first and second electrodes 7, 8 mean that the hypothetical peak values of a corresponding continuous force profile 27, 29 are unlikely to be directly sampled.

In theory, the discrete sampling provided by the first values 26 may be interpolated to estimate the $y$ coordinates $y_1$, $y_2$ and corresponding signal maxima $Vy_1$, $Vy_2$, and the second values 28 may be similarly interpolated to estimate the x coordinates $x_1$, $x_2$ and corresponding signal maxima $Vx_1$, $Vx_2$.

Each first and second electrode 7, 8 is effectively an equipotential (very high resistances of the electrodes 7, 8 would be impractical for the operation of the touch panel system 1), and the touch controller 3 does not have prior knowledge or information about the actual locations 24a, 25a, for example, no information from other sensor types such as capacitive or resistive touch sensors. Consequently, based on the interpolated coordinates $x_1$, $x_2$, $y_1$, $y_2$ alone, there are two possible solutions for the locations of the forces $F_1$, $F_2$ (i.e. two possible pairings of the coordinates):

1. The actual first location 24a ($x_1$, $y_1$) and the actual second location 25a ($x_2$, $y_2$); and
2. A possible first location 24b ($x_2$, $y_2$) and a possible second location 25b ($x_1$, $y_2$).

Theoretically, it might be possible to confirm the set of actual locations 24a, 25a using the interpolated maxima $Vy_1$, $Vy_2$ and $Vx_1$, $Vx_2$. For example, if $F_1>F_2$ then it should follow that $Vy_1>Vy_2$ and $Vx_1>Vx_2$. However, there are a number of reasons why such signal level comparisons are inaccurate and unreliable in practical circumstances.

Firstly, an applied force $F_1$, $F_2$ may be applied directly over a first electrode 7, and mid-way between a pair of second electrodes 8, leading to a relatively high peak signal on the first electrode 7 and relatively low, off-peak signals on the pair of second electrodes 8. Such discrepancies may lead to inaccurate interpolation when the sampling points are relatively widely spaced. For example, the prevailing technology of projected capacitance touch panels typically uses x- and $y$-electrodes having a pitch of about 5 mm, compared to a typical area of a user touch which is less than about 10 mm. If an error incurred during interpolation leads to a change in relative size compared to the forces, for example if $F_1>F_2$ but $Vy_1<Vy_2$, then the possible locations 24b, 25b will be selected as the solution instead of the actual locations 24a, 25a.

Secondly, induced piezoelectric charges 19 are typically low amplitude, for example in the range from 10 to 1,000 pC, and require amplification in order to be measured. The relatively high gains used, for example in the range from $1\times 10^9$ to $1\times 10^{11}$ V·C$^{-1}$, and the transient nature of piezoelectric signals result in a challenging noise environment. This may be compounded by the fact that many touch panel systems 1 are intended for use in unearthed, handheld devices. Additionally, a user may act as an antenna to couple external electrical fields to the electrodes 7, 8, or a user may be charged with static electricity (for example from their clothing) when they interact with the first or second touch panel 2, 13. Any charge on the user will couple to the individual first and second electrodes 7, 8 depending on proximity to a user's digit which applies the force. The situation is similar if additionally or alternatively the user is acting as an antenna for noise pickup, for example from mains electrical supplies. Considering again the situation that an applied force $F_1$, $F_2$ may be applied directly over a first electrode 7, and mid-way between a pair of second electrodes 8, the first electrode will be relatively more strongly coupled to the external charge/electric field. If $F_1>F_2$, the effects of noise and coupling to external charges/electric fields may also cause an error in one or both of the expected inequalities $Vy_1>Vy_2$ and $Vx_1>Vx_2$. This could cause the possible locations 24b, 25b to be selected as the solution instead of the actual locations 24a, 25a.

Thirdly, typical multi-touch gestures used with the prevailing technology of projected capacitance sensing include a double finger tap, a pinch, a rotation of two fingers one about the other or about a common centre of rotation, and so forth. What these typical gestures have in common is that they are usually performed with one hand, and most of the applied pressure may be developed in the shoulder, arm and wrist. Consequently, in most practical applications of multi-touch gestures, first and second applied forces $F_1$, $F_2$ are likely to be very similar in magnitude. Consequently, even small amounts of noise or minor errors incurred from the interpolation may cause inaccuracies in the relative amplitudes of the maxima $Vy_1$, $Vy_2$, $Vx_1$, $Vx_2$.

Fourthly, for locations approaching the perimeter (also referred to as edge) of a touch panel 2, 13, symmetric interpolation cannot be used, and asymmetric interpolation or even extrapolation may be necessary to estimate one or more of the locations coordinates $x_1$, $x_2$, $y_1$, $y_2$ and the corresponding maxima $Vy_1$, $Vy_2$, $Vx_1$, $Vx_2$. Consequently, when one force $F_1$, $F_2$ is applied close to a perimeter of the touch panel 2, 13, the possibility of inaccuracies in the relative amplitudes of the maxima $Vy_1$, $Vy_2$, $Vx_1$, $Vx_2$ may be increased.

For all the reasons explained hereinbefore, the estimated maxima $Vy_1$, $Vy_2$ and $Vx_1$, $Vx_2$ cannot provide reliable disambiguation between the two sets of locations 24a, 25a and 24b, 25b.

The inventors of the present specification have developed structures and methods which enable determining the locations of two or more concurrently applied forces $F_1$, $F_2$ in a way which may be more robust against errors incurred during interpolation, may be more robust against noise, and may be more robust against coupling to external charges and/or electric fields. Moreover, the structures and methods of the present specification may allow accurate disambiguation when one or more applied forces $F_1$, $F_2$ are applied proximate to a perimeter of a touch panel 2, 13.

Figure 6:
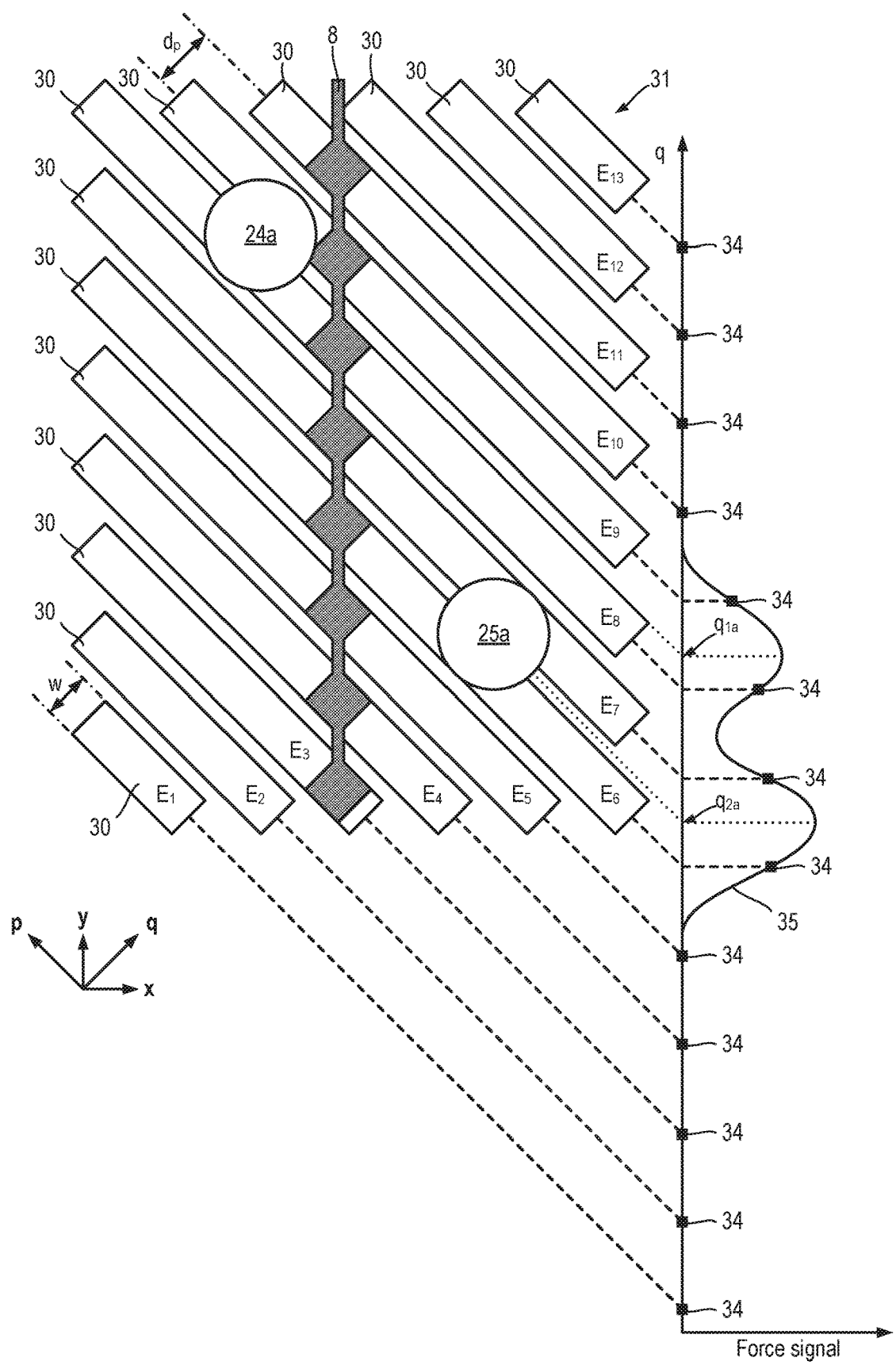
FIGS. 6 and 7 illustrate a first force-sensing multi-touch panel.

The inventors of the present specification have found that the potential ambiguity in piezoelectric only force-sensing touch panels may be resolved by replacing the counter electrode 14 with a number of distinct, third electrodes 30 (FIG. 6, also referred to herein as separate counter electrodes 30). The structures and methods of the present specification may be applied to any force-sensing touch panel which includes a layer of piezoelectric material 9, along with and first and second electrodes 7, 8 arranged to define a coordinate system for sensing a location of a force applied to the touch panel. The third electrodes 30 (FIG. 6) according to the present specification are configured such that signals received from the first, second and third electrodes 7, 8, 30 enable determining unique locations corresponding to two or more forces applied to a touch panel concurrently.

Force-Sensing Multi-Touch Panel

Figure 7:
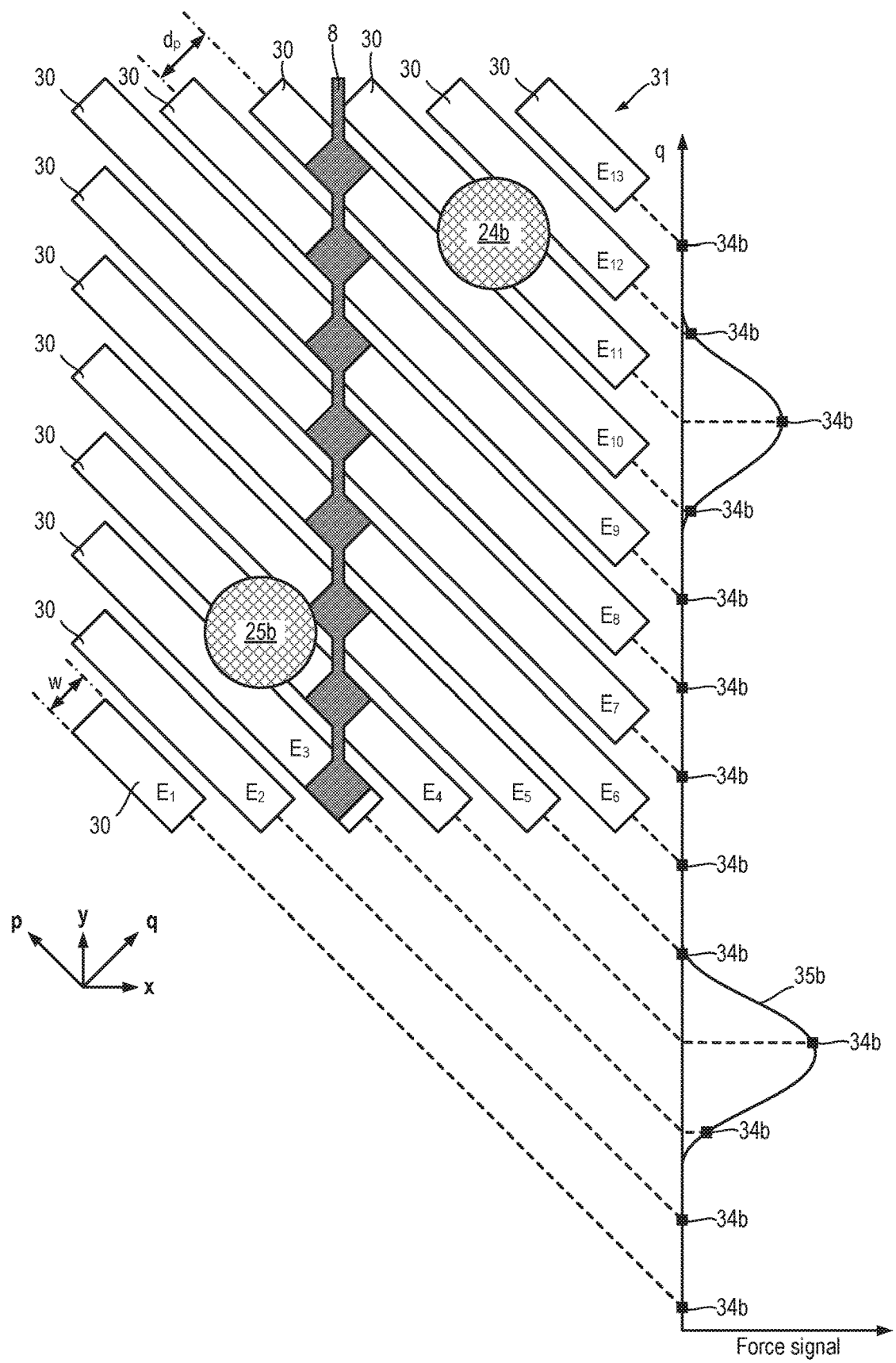
Figure 8:
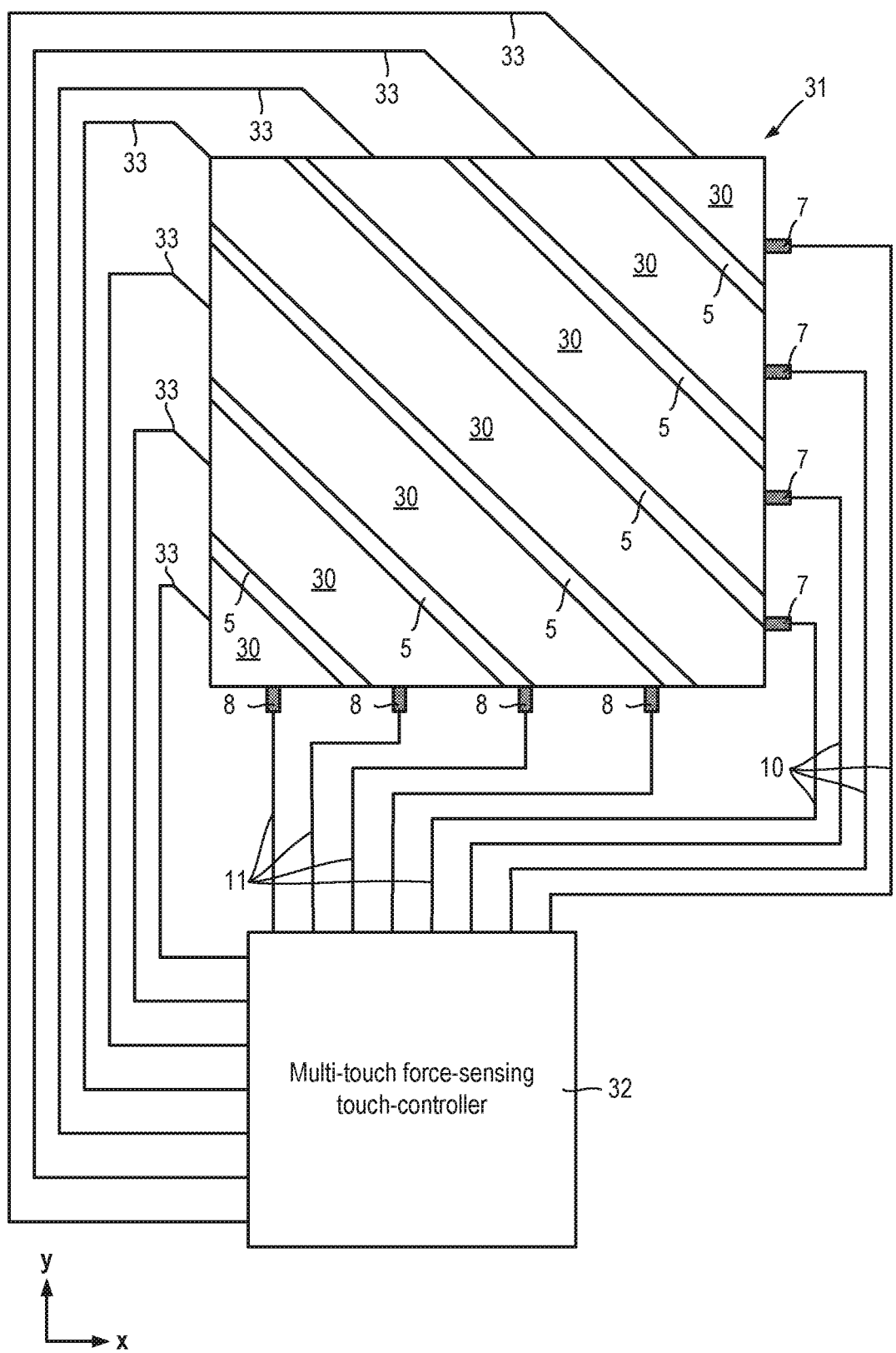
FIG. 8 illustrates a system of a force-sensing multi-touch panel and a force-sensing multi-touch controller.

Referring also to FIGS. 6, 7 and 8, a first force-sensing multi-touch panel 31 (also referred to as first multi-touch panel 31) and a force-sensing multi-touch controller (also referred to as multi-touch controller) 32 are illustrated.

The first multi-touch panel 31 is the same as the second touch panel 13, except that the counter electrode 14 is replaced by a number of third electrodes 30. The layout of first and second electrodes 7, 8 has been illustrated in FIGS. 1 and 5, and in the interests of clarity only the third electrodes 30 and one second electrode 8 (to indicate relative positions) are shown in FIGS. 6 and 7. The first multi-touch panel 31 remains fully capable of operating with a single applied force. In other words, the first multi-touch panel 31 supports, but does not require, two or more concurrently applied forces.

Each third electrode 30 of the first multi-touch panel 31 extends in a third direction p, which lies perpendicular to the thickness direction z, and at 45 degrees between the second direction y and the negative of the first direction x. The third electrodes 30 are disposed in an array spaced apart in a fourth direction q with a pitch (or spacing) of $d_p$. The fourth direction q lies perpendicular to the thickness direction z, and at 45 degrees between the first direction x and the second direction $y$. In this example, the pitch $d_p$ is $d_p = d_x \cos(45) = d_y \cos(45)$. The third electrodes 30 of the first multi-touch panel 31 take the form of rectangles having a width w in the fourth direction q. As drawn in FIG. 6, the width w is approximately equal to the side length of one of the diamonds making up the first and second electrodes 7, 8. However, the width w of the third electrodes 30 may vary without substantially altering the function of the third electrodes 30.

The multi-touch controller 32 is similar to the touch controller 3, except that each of the third electrodes 30 is also connected to a corresponding charge amplifier 20 via a corresponding conductive trace 33. The multi-touch controller 32 obtains third measured values 34 corresponding to induced piezoelectric charges 19 from the third electrodes 30.

Referring in particular to FIG. 6, the first force $F_1$, applied to the first multi-touch panel 31 at the actual first location 24a having coordinates $(x_1, y_1)$, corresponds to a projected position $q_{1a}$. The second force $F_2$, applied to the first multi-touch panel 31 at the actual second location 25a having coordinates $(x_2, y_2)$, corresponds to a projected position $q_{2a}$. The applied forces $F_1, F_2$ are detected by the multi-touch controller 32 as a set of first measured values 26 corresponding to the first electrodes 7 and a set of second measured values 28, in the same way as the second touch panel 13 and touch-controller 2. Additionally, the applied forces $F_1, F_2$ are also detected by the multi-touch controller 3 as a set of third measured values 34 corresponding to the third electrodes 30. As a visual guide, an underlying force signal profile 35 as a function of the q coordinate is also shown.

Although the actual locations 24a, 25a and possible locations 24b, 25b may be difficult or impossible to distinguish based only on the first and second values 26, 28, the addition of the third measured values 34 permits clear disambiguation without any need to rely on the unreliable interpolated/extrapolated maxima $Vy_1, Vy_2, Vx_1, Vx_2$.

For example, the actual locations 24a, 25a give rise to the corresponding third measured values 34 (having underlying force signal profile 35), whereas referring now in particular to FIG. 7, the possible locations 24b, 25b would result in a distinctly different pattern of third measured values 34b (having underlying force signal profile 35b). It may be observed that the third measured values 34 corresponding to the actual locations 24a, 25a exhibit peaks for the third electrodes 30 labelled $E_6$ to $E_9$. By contrast, if the forces $F_1, F_2$ were at the possible locations 24b, 25b instead, then the third measured values 34b corresponding to the possible locations 24a, 25a would exhibit peaks for the third electrodes 30 labelled $E_3$ to $E_5$ and $E_{10}$ to $E_{12}$. Consequently, because the third measured values 34 are consistent with the actual locations 24a, 25a, the multi-touch controller 32 may discount the possible locations 24b, 25b. In this way, the multi-touch controller 32 and first multi-touch panel 31 may provide reliable and unambiguous determination of the locations 24a, 25a and coordinates $(x_1, y_1), (x_2, y_2)$ of the first and second forces $F_1, F_2$. In other words, the multi-touch controller 32 is configured, in combination with the first multi-touch panel 31, to determine unique locations corresponding to two or more forces $F_1, F_2$ applied to the multi-touch panel 31 concurrently, based on the first, second and third measured values 26, 28, 34.

In addition to disambiguation of multi-touch locations, the information from the third electrode 30 may also be used by the multi-touch controller 32 to refine the coordinates $(x_1, y_1), (x_2, y_2)$ and measured values of the applied forces $F_1, F_2$.

Figure 9:
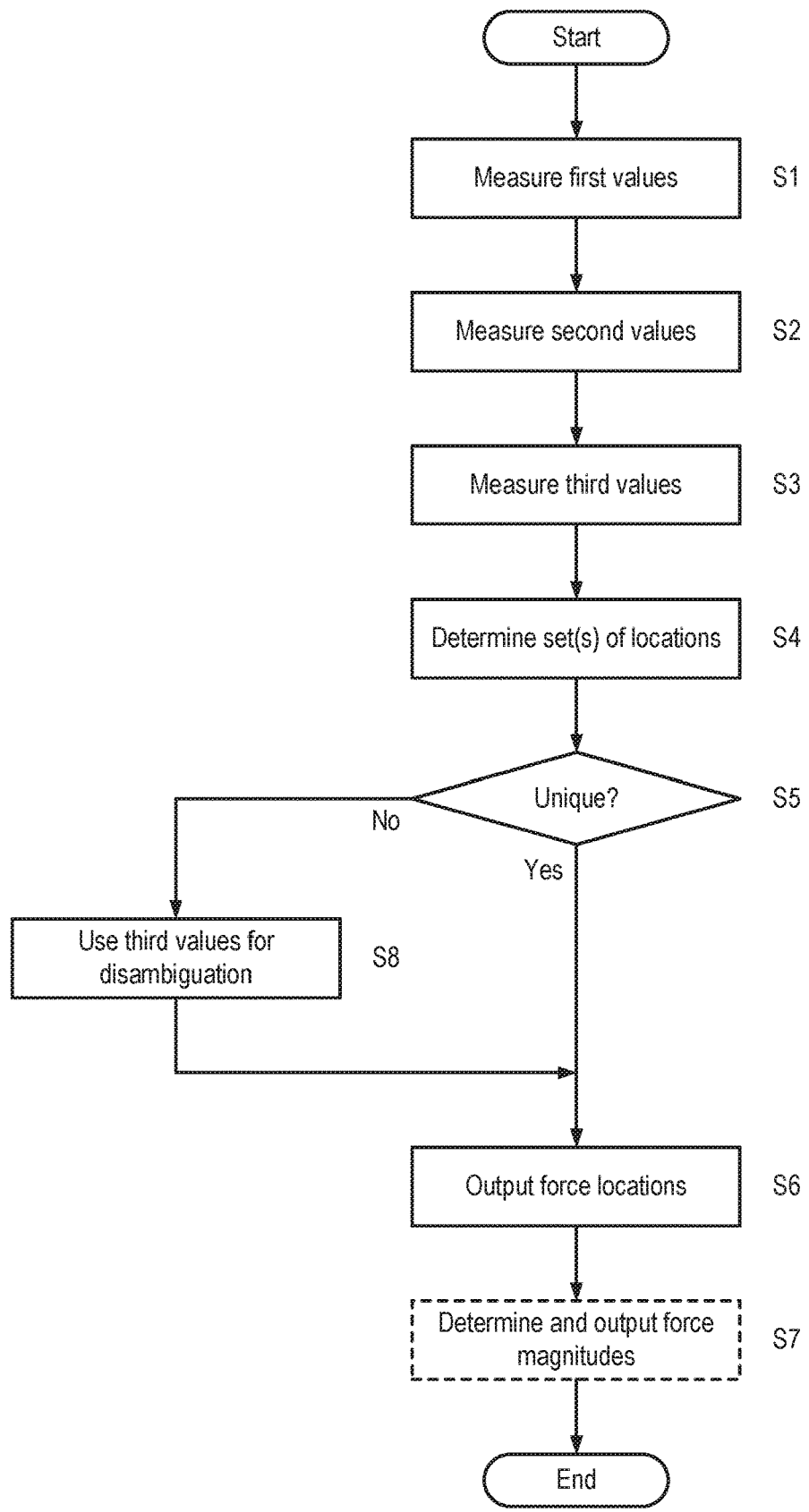
FIG. 9 is a process flow diagram of a method of determining locations corresponding to two or more forces applied to a touch panel concurrently.

Referring also to FIG. 9, a process flow diagram is shown illustrating a method of operating the multi-touch controller 32.

The multi-touch-controller measures the first measured values 26, each corresponding to a charge induced on a respective first electrode 7 in response to application of one or more forces $F_1, F_2$ to the multi-touch panel 31 (step S1).

The multi-touch-controller measures the second measured values 28, each corresponding to a charge induced on a respective second electrode 8 in response to application of one or more forces $F_1, F_2$ to the multi-touch panel 31 (step S2).

The multi-touch-controller measures the third measured values 34, each corresponding to a charge induced on a respective third electrode 30 in response to application of one or more forces $F_1, F_2$ to the multi-touch panel 31 (step S3).

The multi-touch-controller determines, based on the first and second measured values 26, 28, one or more possible sets of locations 24a, 25a, 24b, 25b for the one of more forces $F_1, F_2$ (step S4).

If there is a unique location (step S5: Yes), i.e. if a single force $F_1, F_2$, is applied to the multi-touch panel 31, then the corresponding location is output (step S6). For example, the multi-touch controller 32 may output the location to an operating system or other program being executed by one or more digital electronic processors (not shown) of a device incorporating the multi-touch panel 31 and multi-touch controller 32. Optionally, the multi-touch controller 32 may additionally determine and output the magnitudes of the force (step S7). For example, using conditional integration to convert the transient piezoelectric signals into static or quasi-static values related to the magnitude of the applied force $F_1$, $F_2$.

However, if two or more sets of possible locations are consistent with the first and second measured values 26, 28 (step S5: No), i.e. more than a single force $F_1$, $F_2$ is applied, then the multi-touch controller 32 may use the third measured values 34 to resolve the ambiguity, as described hereinbefore (step S8). The locations corresponding to the two or more applied forces $F_1$, $F_2$ are output (step S6), and optionally the multi-touch controller 32 may additionally determine and output the magnitudes of the two or more forces (step S7).

In addition to disambiguation of multi-touch locations, the information from the third electrode 30 may also be used to refine the coordinates $(x_1, y_1)$, $(x_2, y_2)$ and measured values of the applied forces $F_1$, $F_2$.

Although the multi-touch controller 32 has been described including a charge amplifier corresponding to each of the first, second and third electrodes 7, 8, 30, this is not essential. In general, the multi-touch controller 32 may be provided by any device which is capable of measuring, for each of the first, second and third electrodes 7, 8, 30, a charge induced in response to application of one or more forces $F_1$, $F_2$ to the multi-touch panel 31.

The first multi-touch panel 31 and the multi-touch controller 32 may be integrated into any type of electronic device which requires an input mechanism such as, for example, a mobile phone, a smart phone, a tablet computer, a display screen, a laptop computer touch panel or display, a game controller and so forth. The first multi-touch panel 31 and the multi-touch controller 32 have an advantage over conventional projected capacitance touch technologies, because the first multi-touch panel 31 and the multi-touch controller 32 may continue to function when wet or even fully submerged. Conventional projected capacitance touch technologies do not work in such challenging conditions, because the conductivity of water generates false signals and/or masks touch input signals. Consequently, the first multi-touch panel 31 and the multi-touch controller 32 of the present specification may be particularly well suited to integration into a wearable electronic device such as, for example, a watch, a smart watch, a bracelet, a belt, a buckle, glasses, lenses of glasses, frames of glasses, jewellery, and so forth.

Figure 10:
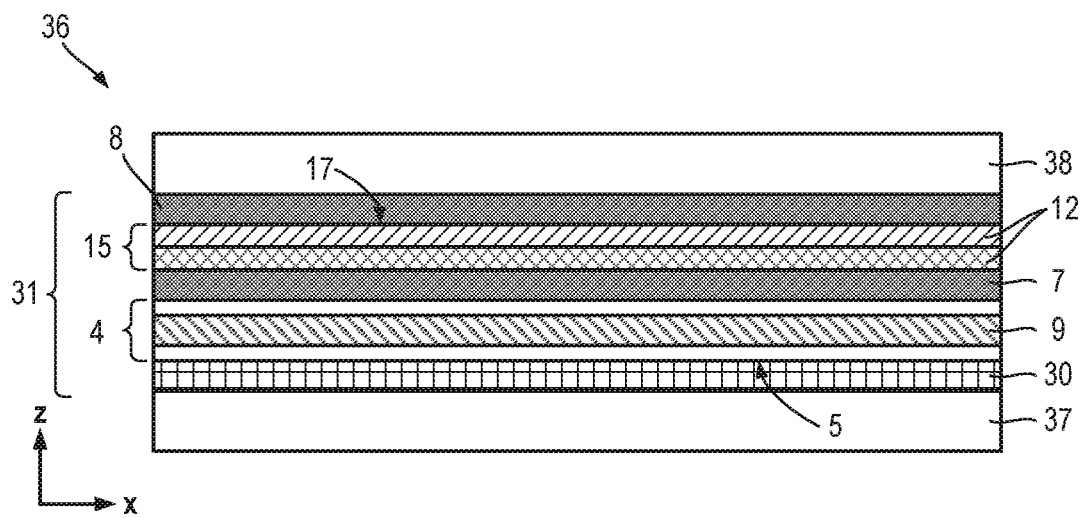
FIG. 10 is a schematic cross-section of a first force-sensing multi-touch display.

Referring also to FIG. 10, a first force-sensing multi-touch display 36 (also referred to as the first multi-touch display 36) is shown.

The first multi-touch display 36 includes the first multi-touch panel 31 stacked between a display 37 and a cover 38. The display 37 may be any type of display such as, for example, an organic light-emitting diode (OLED) display, a liquid crystal display (LCD), a plasma screen, an electrophoretic display, and so forth. The cover 38 is typically formed from glass. However, other materials may be used, for example polycarbonate or other polymers used to provide transparent structural elements.

When the first multi-touch display 36 is in use, the first and second electrodes 7, 8 will be closer to the cover 38, and consequently closer to a user of the multi-touch display 36. The width w of the third electrodes 30 may be made relatively large, for example just less than the pitch $d_p$, in order to maximise the collection of induced piezoelectric charges 19.

Figure 11:
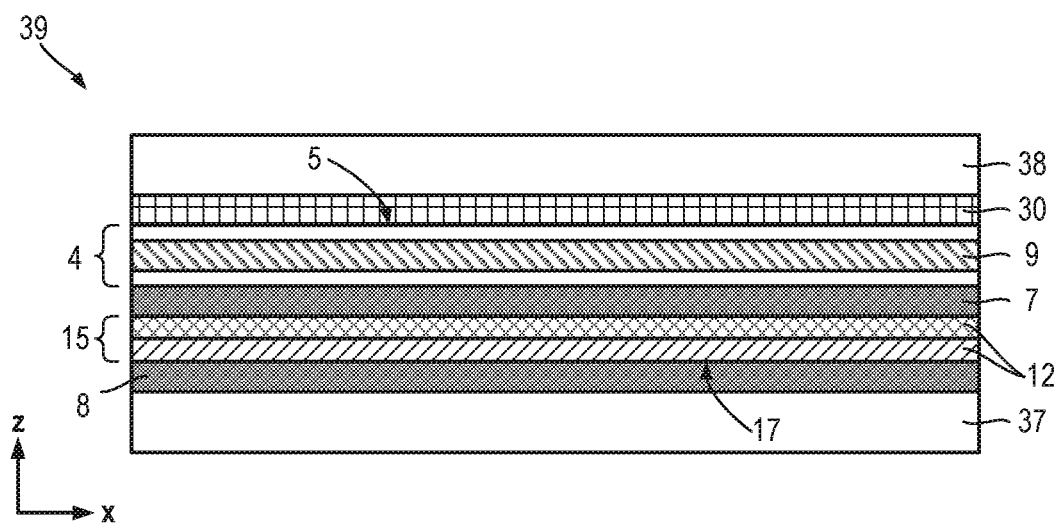
FIG. 11 is a schematic cross-section of a second force-sensing multi-touch display.

Referring also to FIG. 11, a second force-sensing multi-touch display 39 (also referred to as the second multi-touch display 39) is shown.

The second multi-touch display 39 is the same as the first multi-touch display 36, except that the stacking over of the first multi-touch panel 31 is reversed with respect to the display 37 and cover 38. When the second multi-touch display 39 is in use, the third electrodes 30 will be closer to the cover 38, and consequently closer to a user of the second multi-touch display 39. When the second multi-touch display 39 is intended to operate using only piezoelectric force detection, the width w of the third electrodes 30 may be made relatively large, for example just less than the pitch $d_p$, in order to maximise the collection of induced piezoelectric charges 19.

However, if the second multi-touch display 39 is intended to be augmented, at least some of the time, with capacitive touch sensing using the first and second electrodes 7, 8, then the width w of the third electrodes may be made relatively narrow, for example much narrower than a typical width of the first or second electrodes 7, 8, in order to avoid electrostatically screening the first and second electrodes 7, 8 from a user.

Alternative Structures for Force-Sensing Multi-Touch Panels

The illustrated example of the first multi-touch panel 31 includes first and second electrode 7, 8 extending along x- and $y$-axes respectively. However, this need not be the case. In general, each of the first electrodes 7 may extend in any first direction which is perpendicular to the thickness direction z, and each of the second electrodes 8 may extend in any second direction which is perpendicular to the thickness direction z and different to the first direction.

When a force-sensing multi-touch panel, e.g. first multi-touch panel 31 is used to determine a first location 24a corresponding to a first applied force $F_1$ and a second location 25a corresponding to a second applied force the required resolution for the third electrodes 30 may be relatively coarser than the spatial resolution provided by first and second electrodes 7, 8. For example, first and second electrodes 7, 8 may need to be spaced to permit interpolation of locations down to a few mm or less. However, there is a minimum separation of touch locations corresponding to a pair of user digits (imposed by the width of the digits themselves), and the third electrodes 30 may be configured for relatively coarser spatial resolution than the first and second electrodes 7, 8. For example, the third electrodes 30 may be configured to enable disambiguation of locations separated by a distance of greater than or equal to 0.5 cm, greater than or equal to 1 cm, or greater than or equal to 1.5 cm, depending on the applications.

Figure 12:
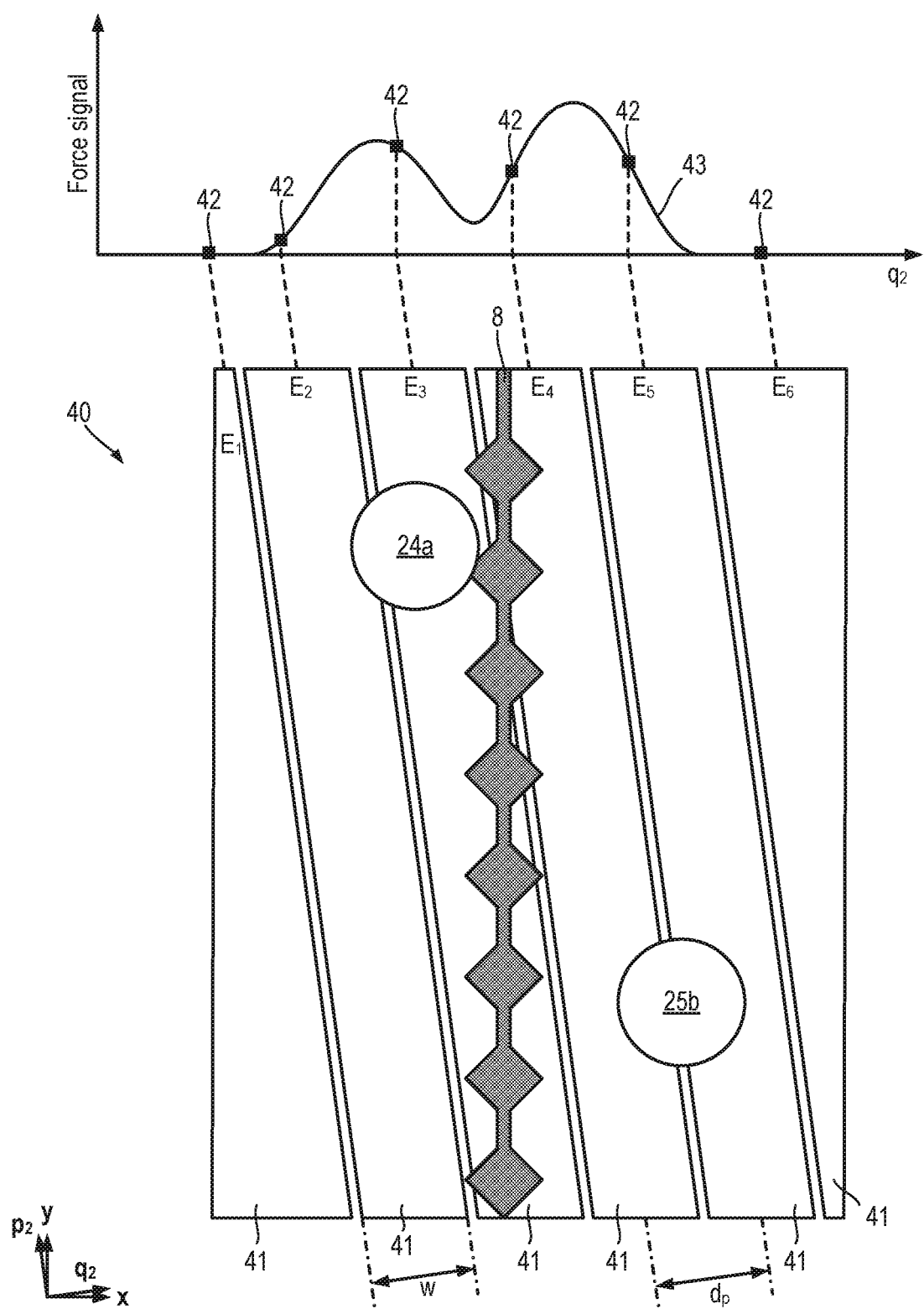
FIGS. 12 and 13 illustrate a second force-sensing multi-touch panel.
Figure 13:
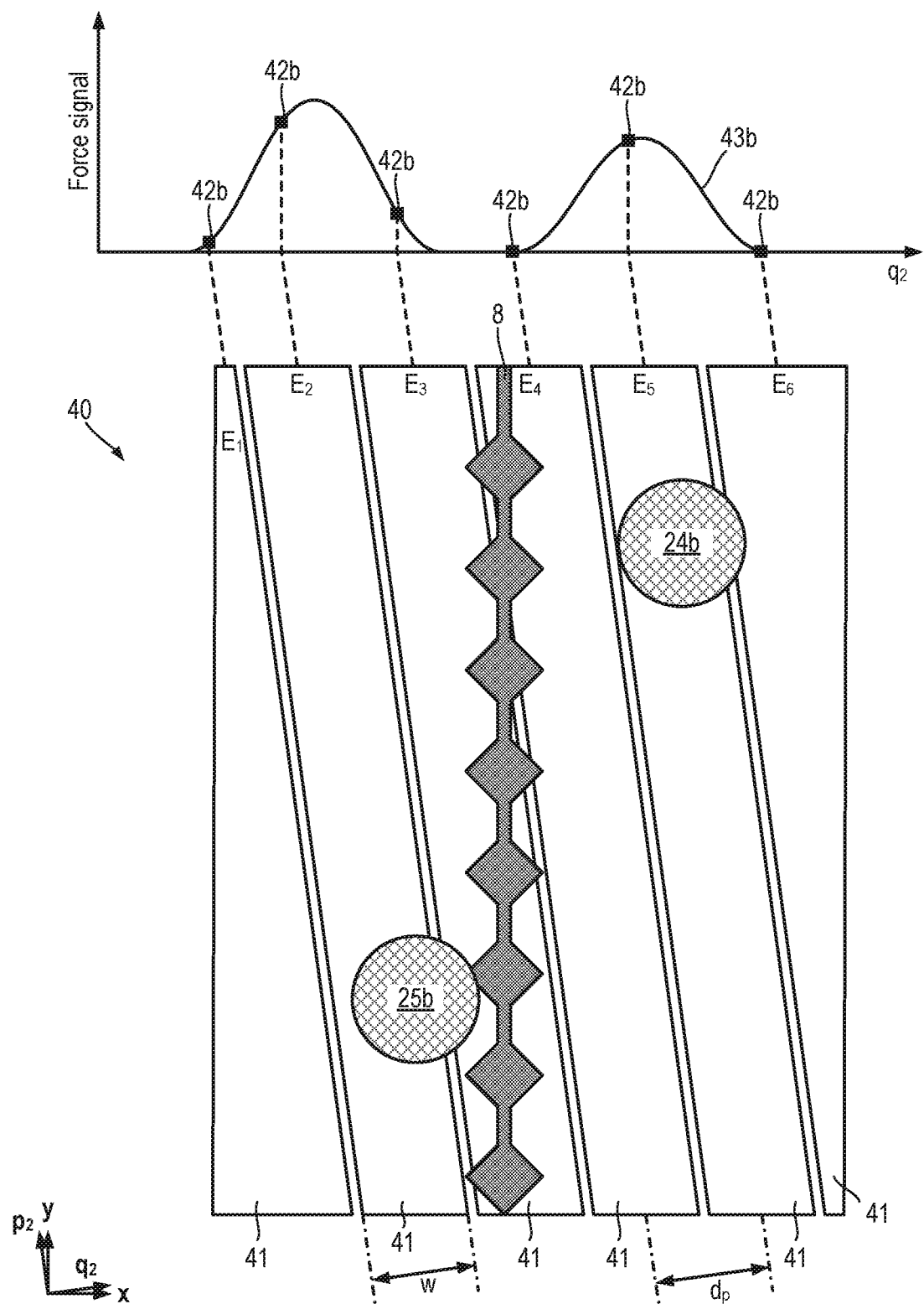

Referring also to FIGS. 12 and 13, an example of a second force-sensing multi-touch panel 40 (also referred to as the second multi-touch panel 40) is shown.

The second multi-touch panel 40 is the same as the first multi-touch panel 31, except that the third electrodes 41 of the second multi-touch panel 40 extend in a third direction $p_2$, which lies perpendicular to the thickness direction z and at about 8 degrees to the second direction $y$, i.e. about 8 degrees to the second electrodes 8. The third electrodes 41 of the second multi-touch panel 40 are disposed in an array spaced in a fourth direction $q_2$ with a pitch (or spacing) of $d_p$. The fourth direction $q_2$ lies perpendicular to the thickness direction z, and at about 8 degrees to the first direction x, i.e. about 8 degrees to the first electrodes 7. The pitch $d_p$ of the third electrodes 41 of the second multi-touch panel 40 provides a coarser spatial resolution than either the first or second electrodes 7, 8.

When first and second forces $F_1$, $F_2$ are applied at the respective locations 24a, 25a as described hereinbefore, the multi-touch controller 32 will measure third measured values 42 having an underlying force signal profile 43. It may be observed that the actual third measured values 42 are distinct from the third measured values 42b having an underlying force signal profile 43 which would be consistent with the possible locations 24b, 25b. Third measured values 42 peak from the third electrode 41 labelled $E_2$, then roughly plateau through third electrodes 41 labelled $E_3$ to $E_5$, consistent with the actual locations 24a, 25a. By contrast, in order to be consistent with the possible locations 24b, 25b, the third measured values 42b would need to have a first peak between third electrodes 41 labelled $E_2$ and $E_3$, and a second peak around the third electrode 41 labelled $E_5$.

The second multi-touch panel 40 illustrates that it is not essential for the third electrodes 41 to lie at 45 degrees to the first and second electrodes 7, 8. The second multi-touch panel 40 also illustrates that the spatial resolution of the third electrodes 41 may be coarser than that of the first and/or second electrodes 7, 8, whilst still enabling disambiguation of the locations of several applied forces $F_1$, $F_2$.

The third electrodes 30, 41, do not need to take the form of an array of substantially linear electrodes. Instead, the third electrodes 30, 41 may take the form of an array of discrete pads across an area of a multi-touch panel 31, 40 substantially corresponding to a coordinate system defined by the first and second electrodes 7, 8.

Figure 14:
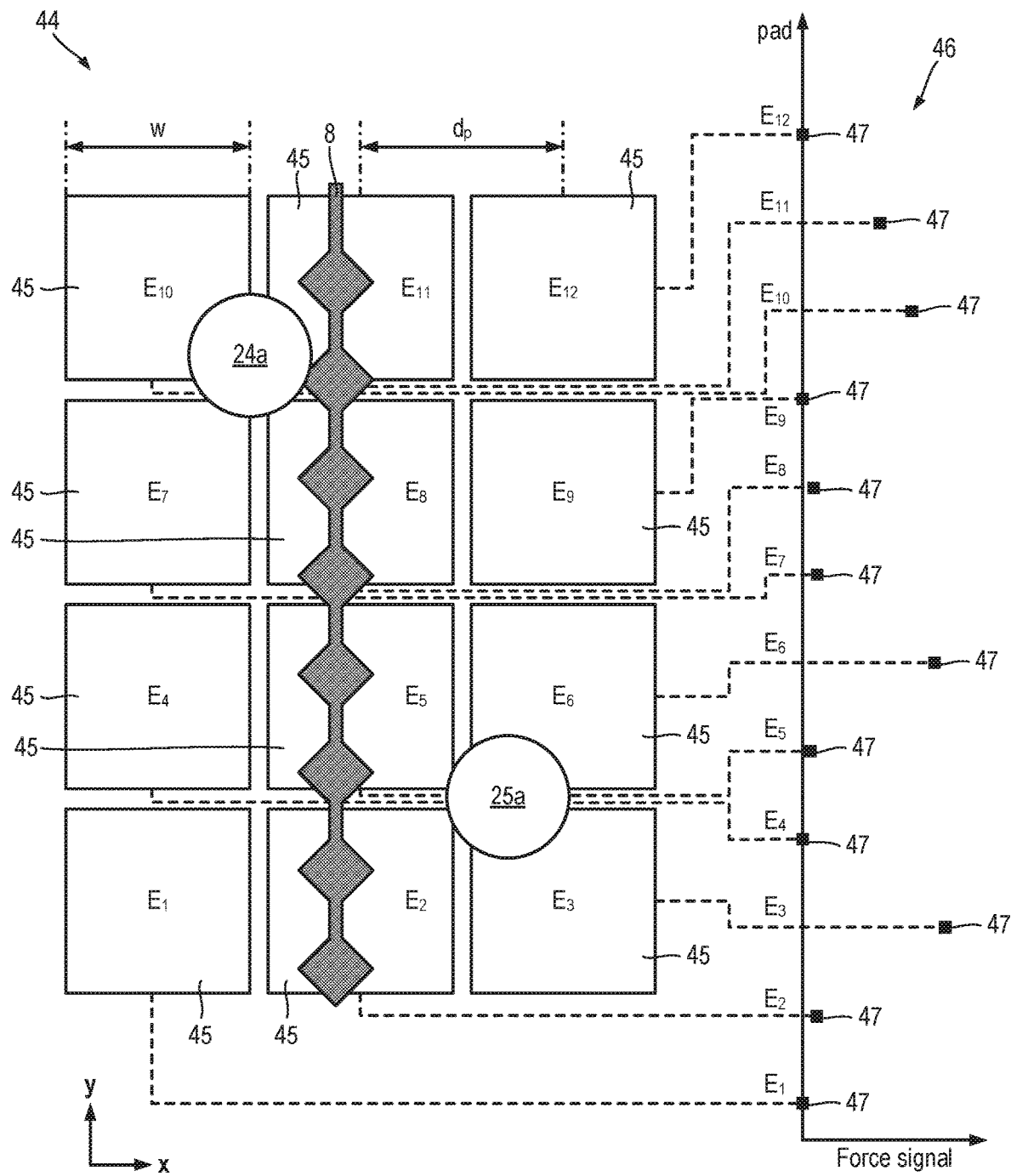
FIGS. 14 and 15 illustrate a third force-sensing multi-touch panel.
Figure 15:
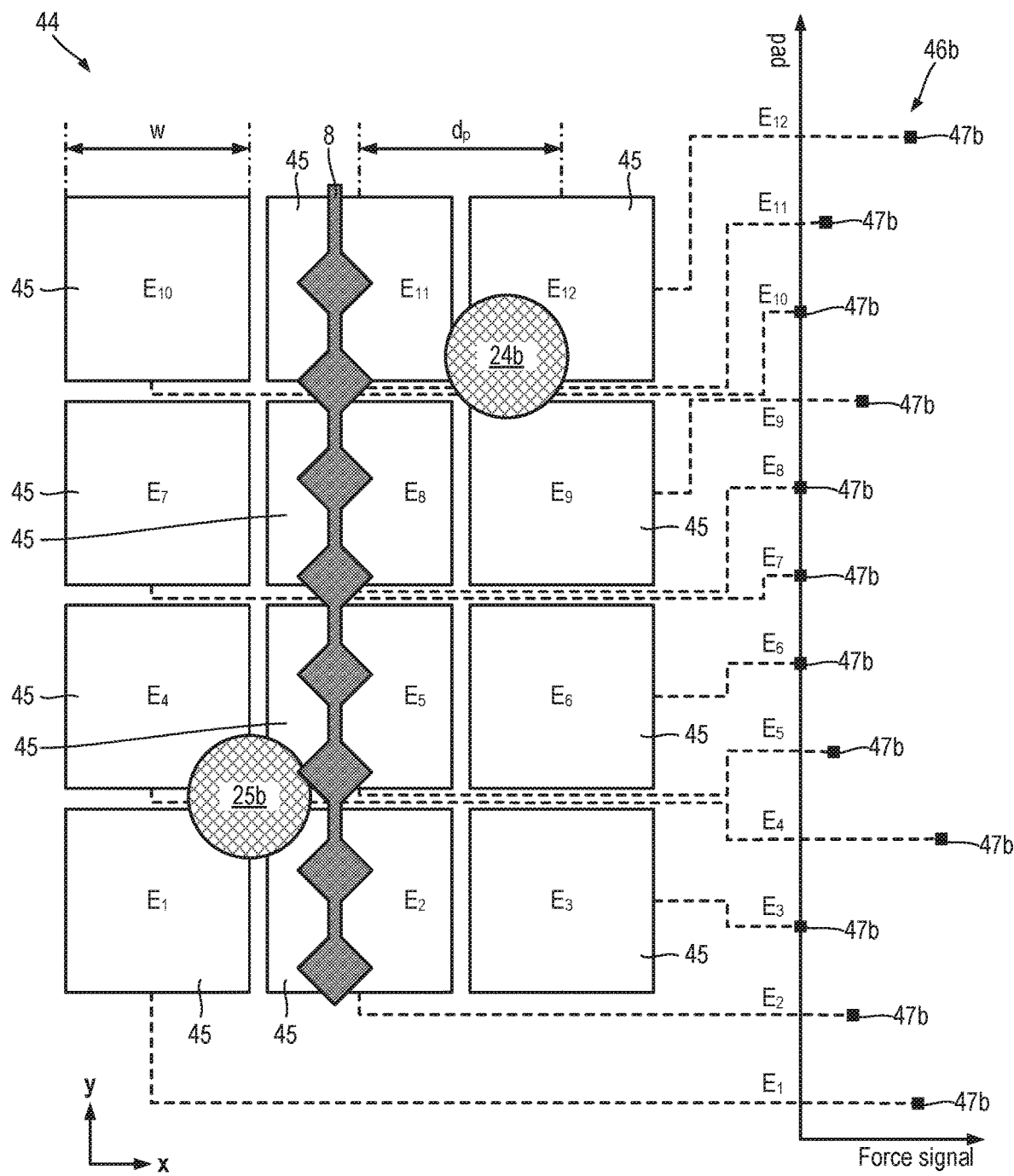

Referring also to FIGS. 14 and 15, a third force-sensing multi-touch panel 44 (also referred to as the third multi-touch panel 44) is shown.

The third multi-touch panel is the same the first and second multi-touch panels 31, 40, except that the third electrodes 30 take the form of discrete square pads 45 spaced in the x- and $y$-directions to form an array. The array of square pads 45 is substantially co-extensive with the Cartesian coordinate system defined by the first and second electrodes 7, 8. The square pads 45 have a side length w and a spacing of $d_p$.

When first and second forces $F_1$, $F_2$ are applied to the respective locations 24a, 25a as described hereinbefore, the pattern 46 of third measured values 47 is distinct from the pattern 46b of third measured values 47b which would be expected if the forces $F_1$, $F_2$ had instead been applied at the possible locations 24b, 25b. It may be observed that the difference in the patterns 46, 46b arise due to the relative positions of the pads 45 and the locations 24a, 25a, 24b, 25b.

In the example shown in FIGS. 14 and 15, each pad 45 has a width w such that the pad 45 will overlap with two or more first electrodes 7 and two or more second electrodes 8. However, this need not be the case, and in general the dimensions w and/or spacing $d_p$ of each pad 45 may be selected based on a desired spatial resolution for uniquely determining locations of two or more applied forces $F_1$, $F_2$. Additionally, the pads 45 need not be square, and may instead be rectangular, circular, or any other regular or irregular shape. Instead of being arranged in a square lattice, pads 45 may be arranged in an oblique (also termed monoclinic) lattice, a centred or un-centred rectangular (also termed orthorhombic) lattice, or a hexagonal lattice.

Figure 16:
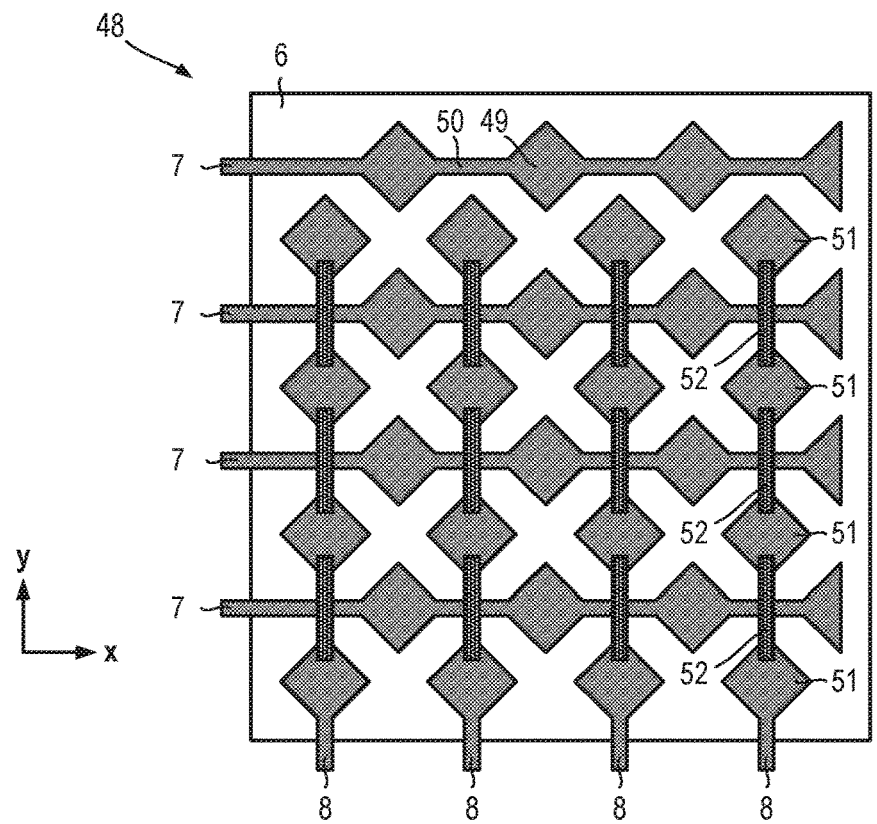
FIG. 16 illustrates a fourth force-sensing multi-touch panel.

Referring also FIG. 16, a fourth force-sensing multi-touch panel 48 (also referred to as fourth multi-touch panel 48) is illustrated.

The fourth multi-touch panel 48 is the same as the first, second or third multi-touch panels 31, 40, 44, except that the second layer structure 15 is omitted, and the first and second electrodes 7, 8 are disposed in a co-planer configuration on the second face 6 of the first layer structure 4. Each first electrode 7 is a continuous conductive region extending in the first direction x, including several diamond segments 49 evenly spaced in the first direction x and connected to one another in the first direction x by relatively narrower bridging segments 50. Each second electrode 8 includes several diamond-shaped pad segments 51 evenly spaced in the second direction $y$ in the similar way to the first electrodes 7. However, unlike the first electrodes 7, the diamond-shaped pad segments 51 of the second electrodes 8 are interspersed with, and separated by, the first electrodes 7. The diamond-shaped pad segments 51 corresponding to each second electrode 8 are connected together by conductive jumpers 52. The jumpers 52 each span a part of a first electrode 7 and the jumpers 52 are insulated from the first electrodes 7 by a thin layer of dielectric material (not shown) which may be localised to the area around the intersection of the jumper 52 and the first electrode 7.

Alternatively, a dielectric layer (not shown) may overlie the second face 6 of the first layer structure 4 and the first and second electrodes 7, 8. Conductive traces (not shown) extending in the second direction y may be disposed over the dielectric layer (not shown), each conductive trace (not shown) overlying the diamond-shaped pad segments 51 making up one second electrode 8. The overlying conductive traces (not shown) may connect the diamond-shaped pad segments 51 making up each second electrode 8 using vias (not shown) formed through the dielectric layer (not shown).

Figure 17:
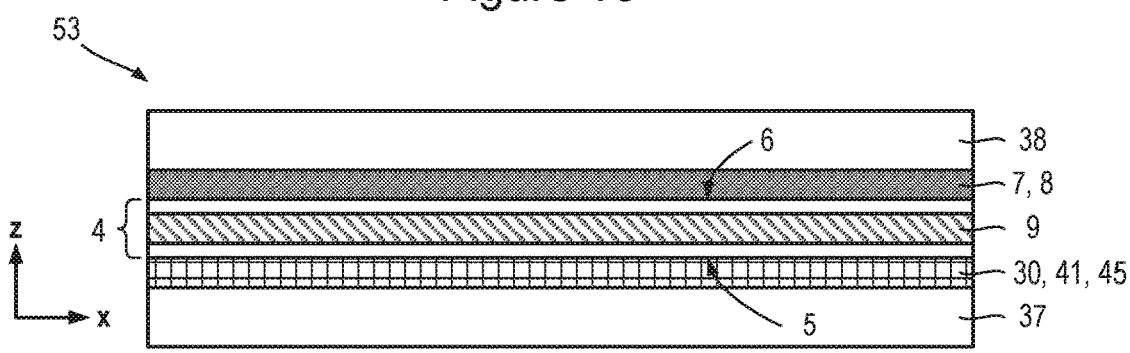
FIG. 17 is a schematic cross-section of a third force-sensing multi-touch display.

Referring also to FIG. 17, a third force-sensing multi-touch display 53 (also referred to as the third multi-touch display 53) is shown.

The third multi-touch display 53 includes the fourth multi-touch panel 48 stacked between the display 37 and the cover 38. When the third multi-touch display 53 is in use, the first and second electrodes 7, 8 will be closer to the cover 38, and consequently closer to a user of the third multi-touch display 53. The width w of the third electrodes 30, 41, 45 may be made relatively large, for example just less than pitch $d_p$, in order to maximise the collection of induced piezoelectric charges 19.

Figure 18:
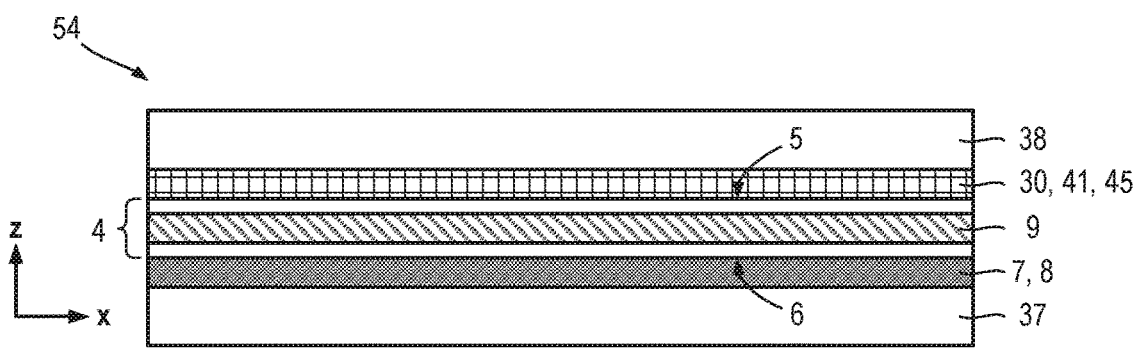
FIG. 18 is a schematic cross-section of a fourth force-sensing multi-touch display.

Referring also to FIG. 18, a fourth force-sensing multi-touch display 54 (also referred to as the fourth multi-touch display 54) is shown.

The fourth multi-touch display 54 is the same as the third multi-touch display 53, except that the stacking over of the fourth multi-touch panel 48 is reversed with respect to the display 37 and cover 38. When the fourth multi-touch display 54 is in use, the third electrodes 30, 41, 45 will be closer to the cover 38, and consequently closer to a user of the fourth multi-touch display 54. When the fourth multi-touch display 54 is intended to operate using only piezoelectric force detection, the width w (and other dimensions) of the third electrodes 30, 41, 45, may be made relatively large, for example just less than pitch $d_p$ in order to maximise the collection of induced piezoelectric charges 19.

However, if the fourth multi-touch display 54 is intended to be augmented, at least some of the time, with capacitive touch sensing using the first and second electrodes 7, 8, then the width w of the third electrodes 30, 41, 45 may be made relatively narrow, for example much narrower than a typical width of the first or second electrodes 7, 8, in order to avoid electrostatically screening the first and second electrodes 7, 8 from a user.

Figure 19:
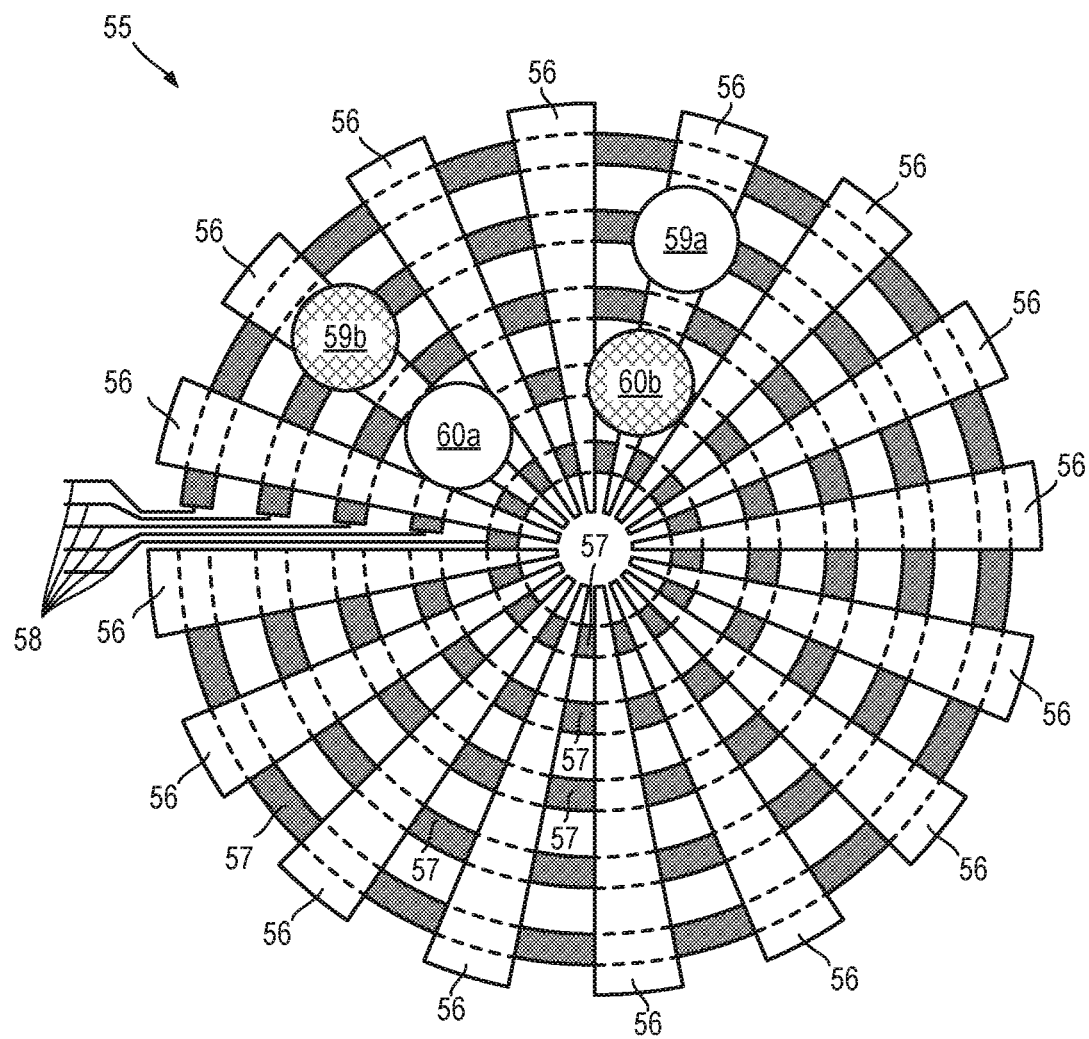
FIG. 19 illustrates a fifth force-sensing multi-touch panel.

Referring also to FIG. 19, a fifth force-sensing multi-touch panel 55 (also referred to as the fifth multi-touch panel 55) is shown, along with two sets of locations 59a, 60a, 59b, 60b corresponding to first and second applied forces $F_1$, $F_2$.

The fifth multi-touch panel 55 is the same as the first, second or third multi-touch panels 31, 40, 44, except that the first and second electrode 7, 8 defining a Cartesian grid have been replaced with radial first electrodes 56 and circumferential second electrodes 57 defining a circular polar coordinate system (θ, r). The radial first electrodes 56 measure the angle θ, and the circumferential second electrodes 57 measure the radius r. The circumferential second electrodes 57 are omitted from a small angular region to permit conductive traces 58 to provide connection to the circumferential second electrodes 57. Conductive traces connecting to the radial first electrodes 56 are not shown in FIG. 19. The fifth multi-touch panel 55 has a generally circular perimeter.

Although the example shown in FIG. 19 includes radial first electrodes 56 and circumferential second electrodes 57 provided on separate planes, separated by the second layer structure 15, in other examples the radial first electrodes 56 and circumferential second electrodes 57 may be co-planer similar to the fourth multi-touch panel 48.

A first force $F_1$ is applied to the fifth multi-touch panel 55 at a third actual location 59a having coordinates ($\theta_1$, $r_1$), and a second force $F_2$ is concurrently (or simultaneously) applied to the fifth multi-touch panel 55 at a fourth actual location 60a having coordinates ($\theta_2$, $r_2$). Based on the first measured values 26, the two angular coordinates 81, 82 may be estimated. Similarly, the second measured values 28 may be used to estimate the two radial coordinates $r_1$, $r_2$. However, in the absence of further information, the locations of the forces $F_1$, $F_2$ cannot be reliably assigned between the set of actual locations 59a ($\theta_2$, $r_1$) and 60a ($\theta_2$, $r_2$), and the set of possible locations 59b ($\theta_1$, $r_2$) and 60b ($\theta_2$, $r_1$). This situation is analogous to the hereinbefore described example of first and second electrodes 7, 8 defining a Cartesian grid.

The solution to resolving this ambiguity for the radial first electrodes 56 and circumferential second electrodes 57 is the same, namely to use third measured values 34, 42, 47 corresponding to third electrodes 30, 41, 45.

Figure 20:
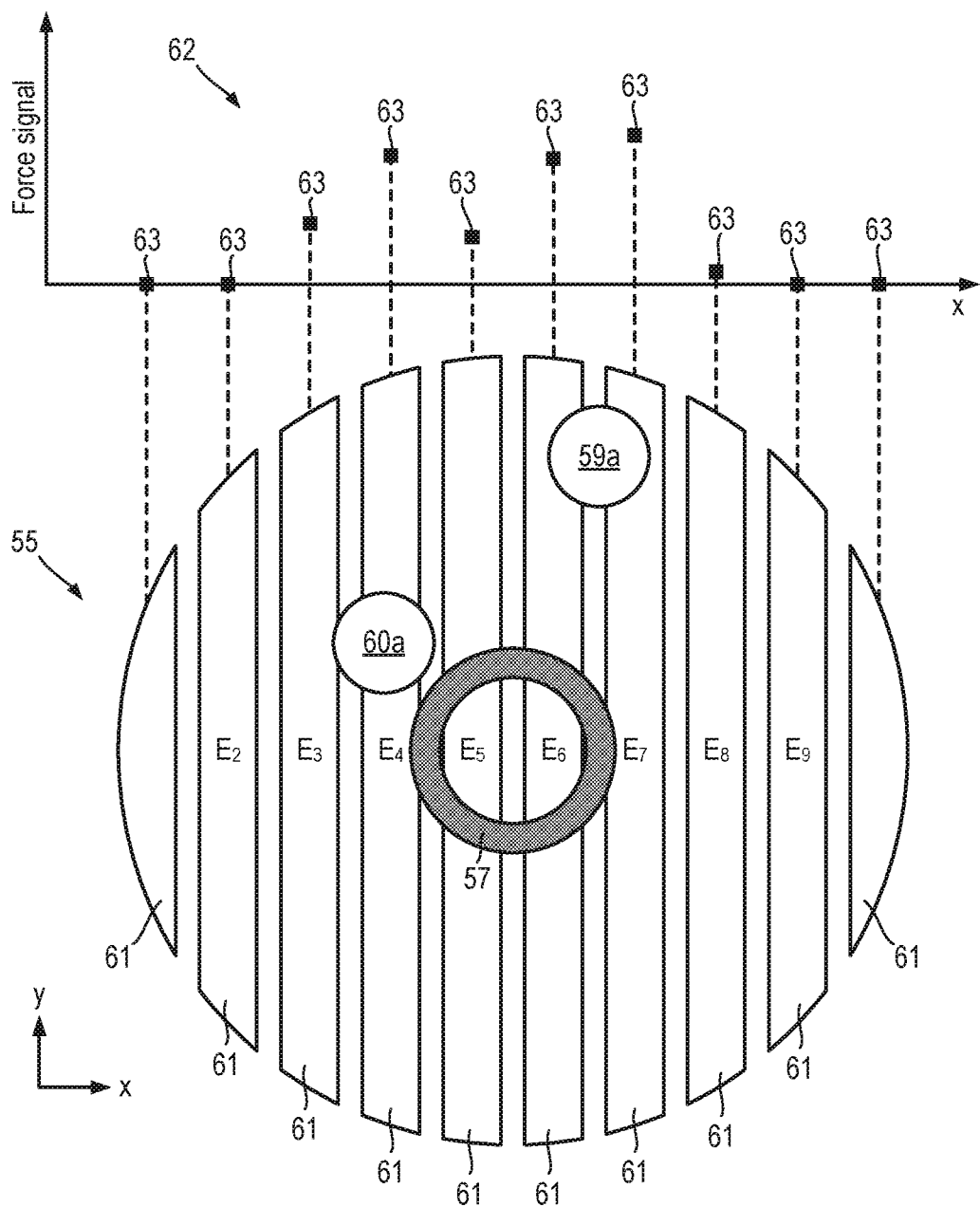
FIGS. 20 and 21 illustrate an example of the fifth force-sensing multi-touch panel shown in FIG. 19.
Figure 21:
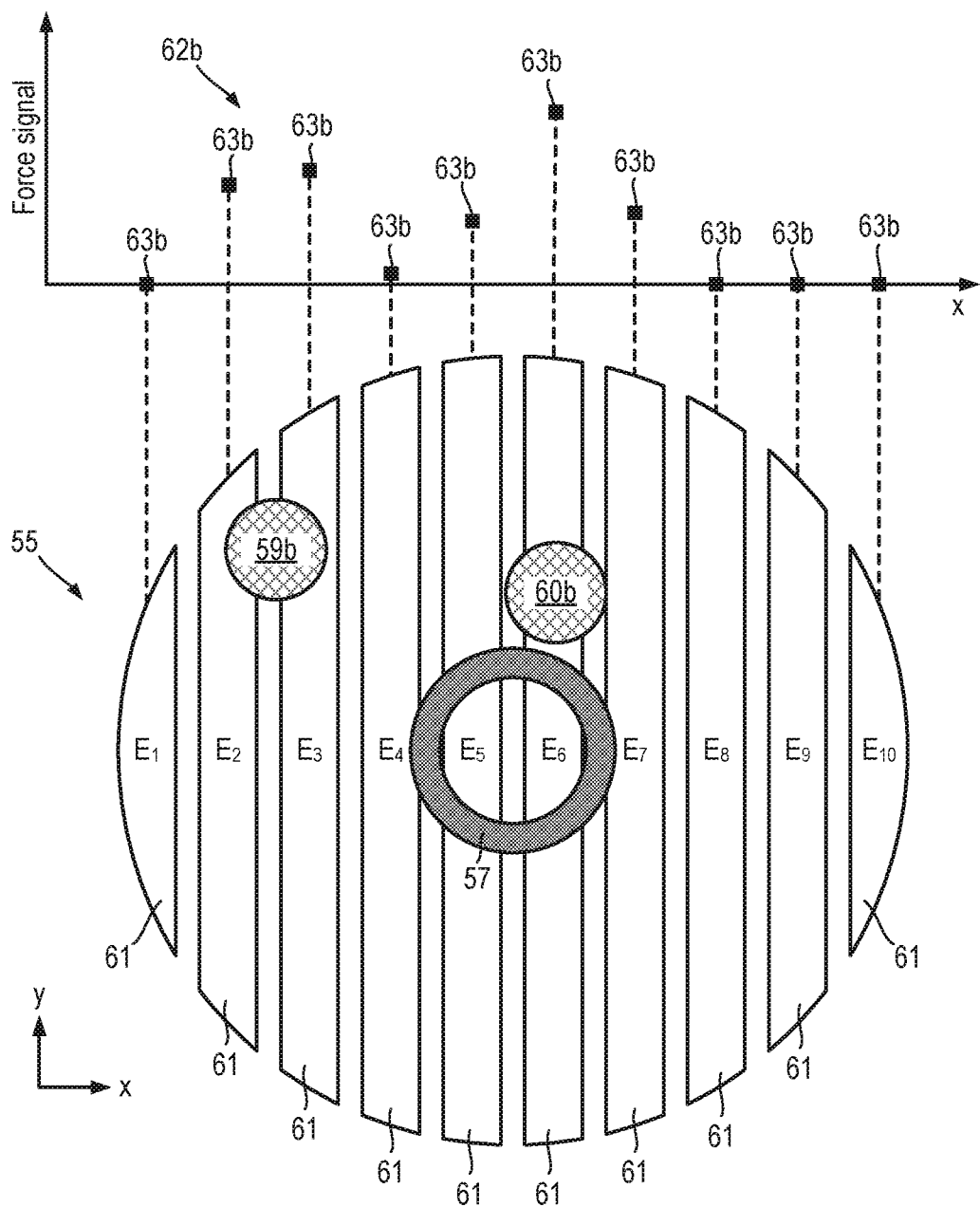

Referring also to FIGS. 20 and 21, an example layout of third electrodes 61 for the fifth multi-touch panel 55 is shown. For clarity, only the innermost second circumferential electrode 57 is shown.

Each third electrode 61 extends in the second direction $y$, and the third electrodes 61 are spaced apart in the first direction x to form an array. As illustrated in FIGS. 20 and 21, each third electrode 61 may be truncated by the circular perimeter of the fifth multi-touch panel 55. Alternatively, the third electrodes 61 may continue beyond the circular perimeter of the fifth multi-touch panel 55.

It may be observed that a pattern 62 formed by the third measured values 63 corresponding to the third electrodes 61 is distinct from a pattern 62b which would be expected for the third measured values 63b if the forces $F_1$, $F_2$ were instead applied at the possible locations 59b, 60b. In this way, the multi-touch controller 32 may use third measured values 63 corresponding to the third electrodes 61 to determine unique locations corresponding to two or more concurrently applied forces $F_1$, $F_2$.

Alternatively, pad electrodes 45 may be used with the fifth multi-touch panel 55.

Although third electrodes 45 in the form of pads should perform similarly for circular coordinates as Cartesian, linear third electrodes 30, 41, 61 may experience relatively worse performance in regions where the linear third electrodes 30, 41, 61 run substantially parallel to the first radial electrodes 56 and/or second circumferential electrodes 57. The shape of the third electrodes 30, 41, 61 may be modified for a circular polar coordinate system so that each third electrode 30, 41, 61 intersects the first radial electrodes 56 and the second circumferential electrodes 57 at an angle which is locally about 45 degrees. The resulting third electrode 65 (FIG. 22) will be spiral shaped.

Figure 22:
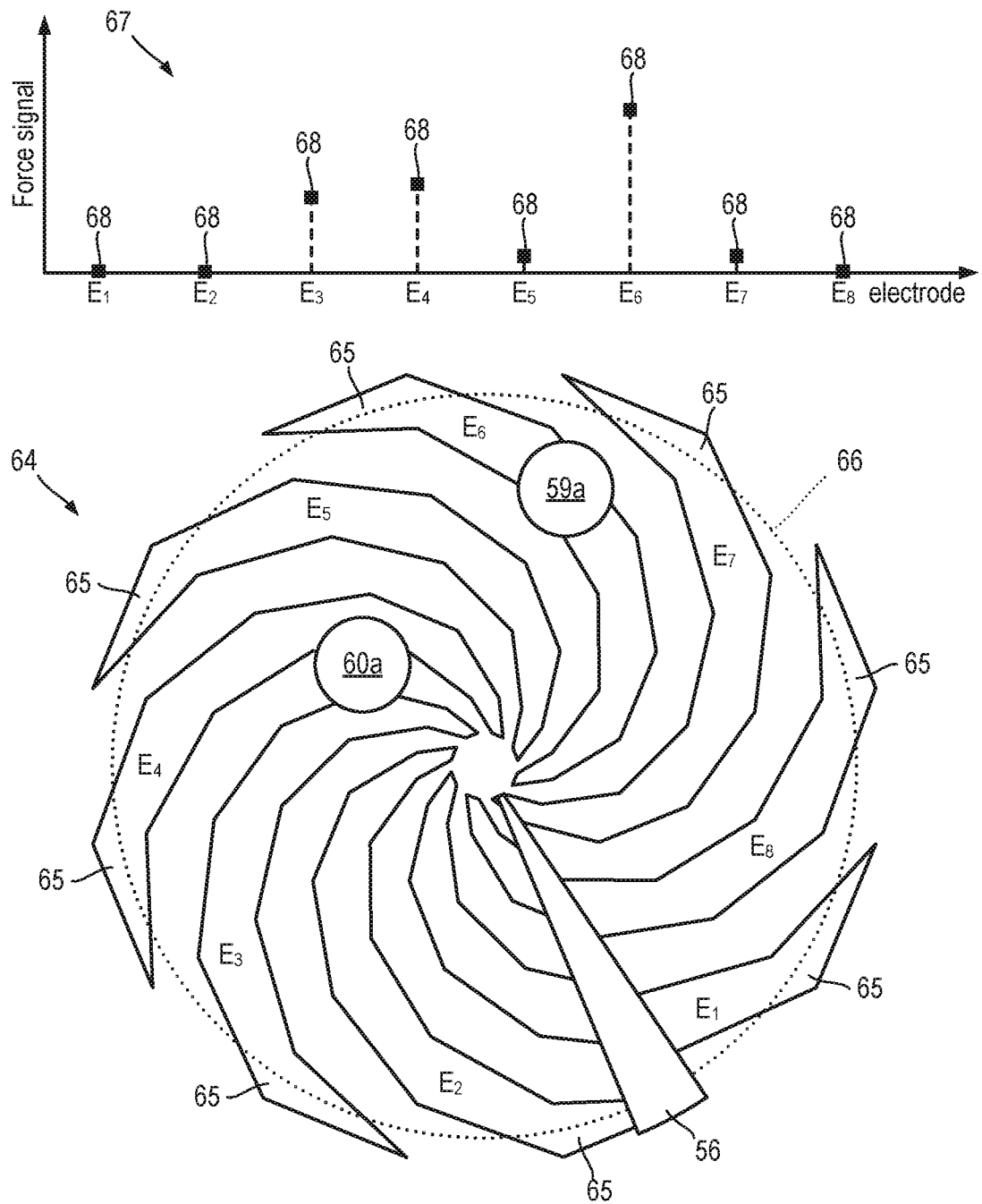
FIGS. 22 and 23 illustrate a sixth force-sensing multi-touch panel.
Figure 23:
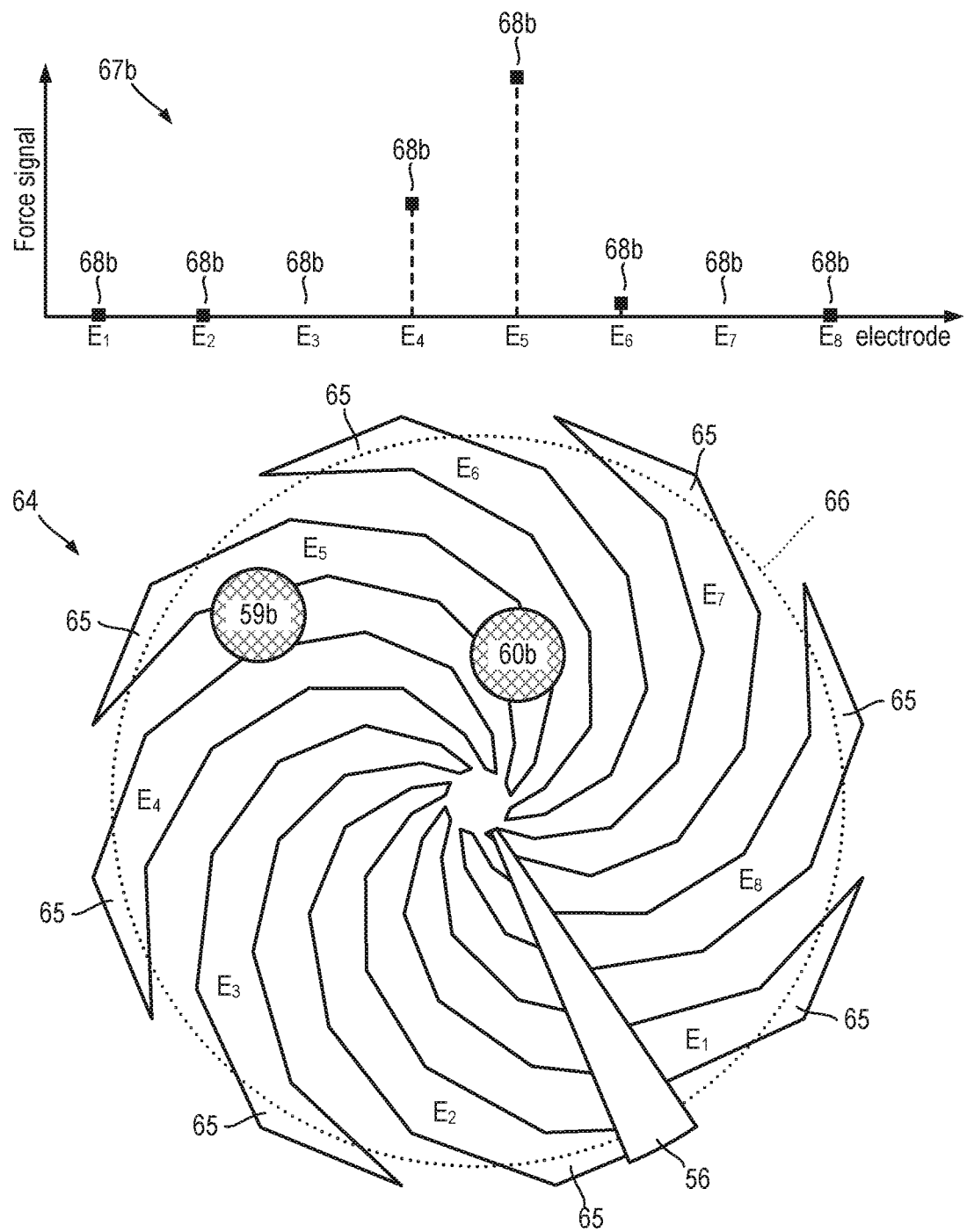

Referring also to FIGS. 22 and 23, a sixth force-sensing multi-touch panel 64 (also referred to as the sixth multi-touch panel 64) is shown, which includes spiral-shaped third electrodes 65. For clarity, only one first radial electrode 56 is shown to indicate relative positions.

Each spiral-shaped third electrode 65 starts from a similar radius to first radial electrodes 56, then spirals outwards with r increasing roughly in proportion to θ until the spiral-shaped third electrode 65 has passed the perimeter 66 of the outermost second circumferential electrode 57. In this way, the third electrodes 65 intersect first radial electrodes 56 and second circumferential electrodes 57 at angles of approximately 45 degrees. An initial angular separation $\Delta\theta_3$ of each spiral-shaped third electrode 65 may be greater than or equal to an angular separation $\Delta\theta_1$ of the first radial electrodes 56. Other spiral shapes making different angles to the first radial electrodes 56 and second circumferential electrodes 57 may be used instead.

It may be observed that a pattern 67 formed by the third measured values 68 corresponding to the third electrodes 65 is distinct from a pattern 67b which would be expected for the third measured values 68b if the forces $F_1$, $F_2$ were instead applied at the possible locations 59b, 60b. In this way, the multi-touch controller 32 may use third measured values 68 corresponding to the spiral-shaped third electrodes 65 to determine unique locations corresponding to two or more concurrently applied forces $F_1$, $F_2$. Additionally, spiral shaped third electrodes 65 may provide relatively larger differences between third measured values 68, 68b corresponding to the actual locations 59a, 60a and the possible locations 59b, 60b, when compared to using linear third electrodes 61 for a circular coordinate system.

Modifications

It will be appreciated that various modifications may be made to the embodiments hereinbefore described. Such modifications may involve equivalent and other features which are already known in the design, manufacture and use of touch panels and component parts thereof and which may be used instead of, or in addition to, features already described herein. Features of one embodiment may be replaced or supplemented by features of another embodiment.

Exemplary force-sensing multi-touch panels, 31, 40, 44, 48, 55, 64 have been described having rectangular, square or circular perimeters. However, in general the perimeter of a force-sensing multi-touch panel according to the present specification may have any shape desired and/or needed for a particular application.

Whilst specific shapes of first, second and third electrodes 7, 8, 30, 41, 45, 56, 57, 61, 65 have been described, the present specification is not limited to these shapes. In general, the first electrodes 7, 56 may enable measurement of the applied force as a function of a first coordinate x, θ of a coordinate system, the second electrodes 8, 57 may enable measurement of the applied force as a function of a second coordinate $y$, r of a coordinate system, and the third electrodes 30, 41, 45, 61, 65 may be arranged to enable determining a single set of locations corresponding to two or more forces applied concurrently to a force-sensing multi-touch panel. For example, each third electrode 30, 41, 45, 61, 65 may correspond to a path requiring parameterisation using both the first and second coordinates x, $y$, θ, r. The third electrodes 30, 41, 45, 61, 65 may correspond to a family of paths (or curves), each of which requires parameterisation using both the first and second coordinates x, $y$, θ, r. In general, the coordinate system is not limited to grid-like or circular coordinate systems, and may be any curvilinear coordinate system capable of describing positions in a plane perpendicular to the thickness direction z.

The force-sensing multi-touch controller 32 may be configured to additionally determine a self-capacitance of each first electrode 7, 56 and a self-capacitance of each second electrode 8, 57. Measurements of self-capacitances may be conducted either sequentially or simultaneously with measurements of the induced piezoelectric charges 19 corresponding to one of more applied forces.

Alternatively, the force-sensing multi-touch controller 32 may be configured to additionally determine a mutual-capacitance between each distinct pairing of first and second electrodes 7, 8, 56, 57. Measurements of mutual-capacitances may be conducted either sequentially or simultaneously with measurements of the induced piezoelectric charges 19 corresponding to one of more applied forces.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A touch panel system comprising:
a display;
a cover;
a controller having a plurality of inputs;
a force-sensing touch panel, the force sensing panel comprising a layer structure stacked in a thickness direction between first and second surfaces, the layer structure comprising, from first surface to second surface:
a plurality of first electrodes and a plurality of second electrodes, the plurality of first and second electrodes configured to define a coordinate system for sensing a location of a force applied to the touch panel in a plane perpendicular to the thickness direction;
a layer of piezoelectric material; and
a plurality of third electrodes;
wherein the plurality of third electrodes are configured such that signals received from the plurality of first, second and third electrodes enable determining unique locations corresponding to two or more forces applied to the touch panel concurrently;
wherein the force-sensing touch panel is disposed between the display and the cover with the plurality of third electrodes between the layer of piezoelectric material and the cover, and wherein widths of electrodes of the plurality of third electrodes are narrower than widths of electrodes of the plurality of first electrodes or electrodes of the plurality of second electrodes to avoid electrostatically screening the plurality of first and the plurality of second electrodes from a user;
wherein each of the plurality of first, second and third electrodes is connected to one of the inputs, wherein the controller is configured to measure, for each of the plurality of first, second and third electrodes, a charge induced in response to application of one or more forces to the touch panel.

2. The touch panel system according to claim 1, wherein:
each of the plurality of first electrodes extends in a first direction which is perpendicular to the thickness direction;
each of the plurality of second electrodes extends in a second direction which is perpendicular to the thickness direction and different to the first direction.

3. The touch panel system according to claim 2, wherein each of the plurality of third electrodes extends in a third direction which is perpendicular to the thickness direction and different to the first and second directions.

4. The touch panel system according to claim 1, wherein the plurality of first and second electrodes define a circular polar coordinate system.

5. The touch panel system according to claim 4, wherein each of the plurality of third electrode extends along a substantially spiral shaped path.

6. The touch panel system according to claim 1, wherein a spatial resolution of the plurality of third electrodes is coarser than a spatial resolution of the plurality of first electrodes, and wherein the spatial resolution of the plurality of third electrodes is coarser than a spatial resolution of the second electrodes.

7. The touch panel system according to claim 1, wherein the controller is further configured to determine, based on the measured induced charges, the unique locations corresponding to two or more forces applied to the touch panel concurrently.

8. The touch panel system according to claim 1, wherein the controller is further configured to determine a self-capacitance of each of the plurality of first electrodes and a self-capacitance of each of the plurality of second electrodes.

9. The touch panel system according to claim 1, wherein the controller is further configured to determine a mutual-capacitance between each distinct pairing of the plurality of first and the plurality of second electrodes.

10. A device comprising the touch panel system according to claim 1.

11. A wearable device comprising the touch panel system according to claim 1.

12. The touch panel system according to claim 1, wherein the controller is configured to:
measure a plurality of first values, each of the plurality of first values corresponding to a charge induced on a respective first electrode of the plurality of first electrodes in response to application of one or more forces to the touch panel;
measure a plurality of second values, each of the plurality of second values corresponding to a charge induced on a respective second electrode of the plurality of second electrodes in response to application of one or more forces to the touch panel;
measure a plurality of third values, each of the plurality of third values corresponding to a charge induced on a respective third electrode of the plurality of second electrodes in response to application of one or more forces to the touch panel;
determine, based on the plurality of first and second values, one or more possible sets of locations for the one of more forces; and in response to two or more sets of locations are consistent with the plurality of first and second values, apply the plurality of third values to determine a unique set of locations.

13. The touch panel system according to claim 1, wherein each of the plurality of third electrodes have a width which is less than or equal to 0.25 times a pitch of the plurality of third electrodes.

14. The touch panel system according to claim 13, wherein the widths of the plurality of third electrodes are less than or equal to 0.1 times the pitch of the plurality of third electrodes.

15. The touch panel system according to claim 14, wherein the widths of the plurality of third electrodes are less than or equal to 0.05 times the pitch of the plurality of third electrodes.

16. A touch panel system comprising:
a display;
a cover;
a controller having a plurality of inputs;
a force-sensing touch panel, the force sensing panel comprising a layer structure stacked in a thickness direction between first and second surfaces, the layer structure comprising, from first surface to second surface:
a plurality of first electrodes and a plurality of second electrodes, the plurality first and second electrodes configured to define a coordinate system for sensing a location of a force applied to the touch panel in a plane perpendicular to the thickness direction;
a layer of piezoelectric material; and
a plurality of third electrodes;
wherein the plurality of third electrodes are configured such that signals received from the plurality of first, second and third electrodes enable determining unique locations corresponding to two or more forces applied to the touch panel concurrently;
wherein the force-sensing touch panel is disposed between the display and the cover with the plurality of third electrodes between the layer of piezoelectric material and the cover, and wherein widths of electrodes of the plurality of third electrodes are narrower than widths of electrodes of the plurality of first electrodes to avoid electrostatically screening the plurality of first electrodes from a user; and
wherein each of the plurality of first, second and third electrodes is connected to one of the inputs, wherein the controller is configured to measure, for each of the plurality of first, second and third electrodes, a charge induced in response to application of one or more forces to the touch panel.

17. The touch panel system according to claim 16, wherein, further, the widths of electrodes of the plurality of third electrodes are narrower than widths of electrodes of the plurality of second electrodes to avoid electrostatically screening the plurality of second electrodes from a user.

18. A touch panel system comprising:
a display;
a cover;
a controller having a plurality of inputs;
a force-sensing touch panel, the force sensing panel comprising a layer structure stacked in a thickness direction between first and second surfaces, the layer structure comprising, from first surface to second surface:
a plurality of first electrodes and a plurality of second electrodes, the plurality first and second electrodes configured to define a coordinate system for sensing a location of a force applied to the touch panel in a plane perpendicular to the thickness direction;
a layer of piezoelectric material; and
a plurality of third electrodes;
wherein the plurality of third electrodes are configured such that signals received from the plurality of first, second and third electrodes enable determining unique locations corresponding to two or more forces applied to the touch panel concurrently;
wherein the force-sensing touch panel is disposed between the display and the cover with the plurality of third electrodes between the layer of piezoelectric material and the cover, and wherein widths of electrodes of the plurality of third electrodes are narrower than widths of electrodes of the plurality of second electrodes to avoid electrostatically screening the plurality of second electrodes from a user; and
wherein each of the plurality of first, second and third electrodes is connected to one of the inputs, wherein the controller is configured to measure, for each of the plurality of first, second and third electrodes, a charge induced in response to application of one or more forces to the touch panel.

19. The touch panel system according to claim 18, wherein, further, the widths of electrodes of the plurality of third electrodes are narrower than widths of electrodes of the plurality of first electrodes to avoid electrostatically screening the plurality of first electrodes from a user.

* * * * *